(12) United States Patent
Padwick et al.

(10) Patent No.: US 12,347,113 B2
(45) Date of Patent: *Jul. 1, 2025

(54) PLANT GROUP IDENTIFICATION

(71) Applicant: Deere & Company, Moline, IL (US)

(72) Inventors: Christopher Grant Padwick, Menlo Park, CA (US); William Louis Patzoldt, Gilroy, CA (US); Benjamin Kahn Cline, San Carlos, CA (US); Olgert Denas, San Jose, CA (US); Sonali Subhash Tanna, Somerset, NJ (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,252

(22) Filed: Oct. 16, 2023

(65) Prior Publication Data

US 2024/0046479 A1 Feb. 8, 2024

Related U.S. Application Data

(63) Continuation of application No. 18/094,927, filed on Jan. 9, 2023, now Pat. No. 11,823,388, which is a
(Continued)

(51) Int. Cl.
*G06T 7/11* (2017.01)
*G06T 7/66* (2017.01)
(Continued)

(52) U.S. Cl.
CPC ............... *G06T 7/11* (2017.01); *G06T 7/66* (2017.01); *G06T 7/73* (2017.01); *G06V 10/255* (2022.01);
(Continued)

(58) Field of Classification Search
CPC . A01M 7/0089; G06V 10/255; G06V 10/751; G06V 10/82; G06V 10/44;
(Continued)

(56) References Cited

U.S. PATENT DOCUMENTS 9,737,068 B1 8/2017 Lytle
10,254,395 B2 4/2019 Nichols et al.
(Continued)

FOREIGN PATENT DOCUMENTS

CN 109416735 A 3/2019
CN 109478232 A 3/2019
(Continued)

OTHER PUBLICATIONS

Lottes, Philipp, et al. "Joint stem detection and crop-weed classification for plant-specific treatment in precision farming." 2018 IEEE/RSJ International Conference on Intelligent Robots and Systems (IROS). IEEE, 2018. (Year: 2018).*
(Continued)

*Primary Examiner* — Vu Le
*Assistant Examiner* — Tracy Mangialaschi
(74) *Attorney, Agent, or Firm* — Fenwick & West LLP

(57) ABSTRACT

A farming machine moves through a field and includes an image sensor that captures an image of a plant in the field. A control system accesses the captured image and applies the image to a machine learned plant identification model. The plant identification model identifies pixels representing the plant and categorizes the plant into a plant group (e.g., plant species). The identified pixels are labeled as the plant group and a location of the pixels is determined. The control system actuates a treatment mechanism based on the identified plant group and location. Additionally, the images from the image sensor and the plant identification model may be used to generate a plant identification map. The plant
(Continued)

identification map is a map of the field that indicates the locations of the plant groups identified by the plant identification model.

21 Claims, 18 Drawing Sheets

Related U.S. Application Data continuation of application No. 16/995,618, filed on Aug. 17, 2020, now Pat. No. 11,580,718.

(60) Provisional application No. 62/888,948, filed on Aug. 19, 2019.

(51) Int. Cl.
| | | |
|---|---|---|
| *G06T 7/73* | (2017.01) | |
| *G06V 10/20* | (2022.01) | |
| *G06V 10/44* | (2022.01) | |
| *G06V 10/75* | (2022.01) | |
| *G06V 10/82* | (2022.01) | |
| *G06V 20/00* | (2022.01) | |
| *G06V 20/10* | (2022.01) | |
| *G06V 20/68* | (2022.01) | |

(52) U.S. Cl.
CPC ............ *G06V 10/44* (2022.01); *G06V 10/751* (2022.01); *G06V 10/82* (2022.01); *G06V 20/188* (2022.01); *G06V 20/38* (2022.01); *G06T 2207/20164* (2013.01); *G06T 2207/30128* (2013.01); *G06T 2207/30188* (2013.01); *G06T 2207/30252* (2013.01); *G06V 20/68* (2022.01)

(58) Field of Classification Search
CPC ...... G06V 20/38; G06V 20/188; G06V 20/68; G06T 7/11; G06T 7/66; G06T 7/73; G06T 2207/30128; G06T 2207/20084; G06T 2207/30252; G06T 2207/30188; G06T 2207/20164
See application file for complete search history.

(56) References Cited

U.S. PATENT DOCUMENTS

| 10,255,670 | B1 | 4/2019 | Wu et al. |
|---|---|---|---|
| 10,713,484 | B2 | 7/2020 | Polzounov et al. |
| 2014/0168412 | A1 | 6/2014 | Shulman et al. |
| 2015/0027043 | A1 | 1/2015 | Redden |
| 2015/0027044 | A1 | 1/2015 | Redden |
| 2017/0041407 | A1 | 2/2017 | Wilbur et al. |
| 2017/0206415 | A1 | 7/2017 | Redden |
| 2017/0223947 | A1 | 8/2017 | Gall et al. |
| 2018/0116094 | A1 | 5/2018 | Redden |
| 2018/0189954 | A1 | 7/2018 | Albrecht et al. |
| 2018/0330165 | A1 | 11/2018 | Halligan et al. |
| 2018/0330166 | A1 | 11/2018 | Redden et al. |
| 2019/0147249 | A1* | 5/2019 | Kiepe ............... G06V 20/20 382/110 |
| 2019/0174739 | A1 | 6/2019 | Peters et al. |
| 2019/0220666 | A1 | 7/2019 | Kiepe et al. |
| 2020/0214281 | A1 | 7/2020 | Koch et al. |
| 2021/0084885 | A1* | 3/2021 | Peters ............ A01M 7/0089 |

FOREIGN PATENT DOCUMENTS

| CN | 109843051 A | 6/2019 | |
|---|---|---|---|
| EP | 3357332 A1 | 8/2018 | |
| WO | WO 99/17606 A1 | 4/1999 | |
| WO | WO 2017/178666 A1 | 10/2017 | |
| WO | WO 2017/194399 A1 | 11/2017 | |
| WO | WO 2018/142371 A1 | 8/2018 | |
| WO | WO 2018/220528 A1 | 12/2018 | |
| WO | WO 2019/094266 A1 | 5/2019 | |
| WO | WO-2019166497 A1 * | 9/2019 | ......... A01M 7/0042 |

OTHER PUBLICATIONS

Sa, Inkyu, et al. "weednet: Dense semantic weed classification using multispectral images and mav for smart farming." IEEE robotics and automation letters 3.1 (2017): 588-595. (Year: 2017).*
European Patent Office, Extended European Search Report and Written Opinion, European Patent Application No. 20854526.9, Jul. 26, 2023, 9 pages.
Fawakherji, M. et al. "Crop and Weeds Classification for Precision Agriculture using Context-Independent Pixel-Wise Segmentation," IEEE International Conference on Robotic Computing, Feb. 25-27, 2019, pp. 146-152.
Lguensat, R. et al. "EddyNet: A Deep Neural Network for Pixel-Wise Classification of Oceanic Eddies," IEEE International Geoscience and Remote Sensing Symposium, Jul. 22-27, 2018, pp. 1764-1767.
Lottes, P. et al. "Joint Stem Detection and Crop-Weed Classification for Plant-Specific Treatment in Precision Farming," IEEE/RSJ International Conference on Intelligent Robots and Systems, Oct. 1, 2018, pp. 8233-8238.
Milioto, A. et al. "Real-Time Semantic Segmentation of Crop and Weed for Precision Agriculture Robots Leveraging Background Knowledge in CNNs," IEEE International Conference on Robotics and Automation, May 21-25, 2018, pp. 2229-2235.
PCT International Search Report and Written Opinion, PCT Application No. PCT/US2019/033699, Aug. 16, 2019, 14 pages.
PCT International Search Report and Written Opinion, PCT Application No. PCT/US2020/046696, Nov. 25, 2020, 17 pages.
Sa, I. et al. "weedNet: Dense Semantic Weed Classification Using Multispectral Images and MAV for Smart Farming," IEEE Robotics and Automation Letters, vol. 3, No. 1, Nov. 20, 2017, pp. 588-595.
United States Office Action, U.S. Appl. No. 18/094,927, filed Jun. 23, 2023, 26 pages.
China National Intellectual Property Administration, Office Action, Chinese Patent Application No. 202080057448.0, Jan. 17, 2025, 18 pages.

* cited by examiner

|  | No. of Boxes | No. of Images |
|---|---|---|
| grass weed | 30185 | 3348 |
| broadleaf weed | 10687 | 3162 |
| cotton | 5934 | 2771 |
| soybean | 15728 | 2748 |
| pigweed | 6850 | 2066 |
| morning glory | 2194 | 654 |
| horseweed/marestail | 251 | 140 |
| kochia | 196 | 102 |
| maize/corn | 208 | 94 |
| nutsedge | 176 | 53 |
| lambsquarters | 48 | 28 |
| velvet leaf | 10 | 10 |

FIG. 5

| Actual \ Predicted | corn | soybean | cotton | pigweed | morning glory | horseweed | kochia | broadleaf | grass weed | nutsedge | lambsquarters | velvet leaf | not present |
|---|---|---|---|---|---|---|---|---|---|---|---|---|---|
| corn | 10 | 7 | 0 | 0 | 0 | 0 | 0 | 1 | 3 | 0 | 0 | 0 | 8 |
| soybean | 0 | 1741 | 0 | 6 | 2 | 0 | 0 | 4 | 20 | 0 | 0 | 0 | 113 |
| cotton | 0 | 1 | 651 | 9 | 5 | 0 | 2 | 9 | 2 | 0 | 0 | 0 | 79 |
| pigweed | 0 | 39 | 12 | 424 | 17 | 1 | 5 | 95 | 53 | 0 | 0 | 0 | 209 |
| morning glory | 0 | 18 | 6 | 1 | 137 | 0 | 0 | 26 | 11 | 0 | 0 | 0 | 142 |
| horseweed | 0 | 1 | 0 | 6 | 2 | 2 | 0 | 10 | 13 | 0 | 0 | 0 | 17 |
| kochia | 0 | 0 | 0 | 4 | 0 | 2 | 0 | 29 | 5 | 0 | 0 | 0 | 8 |
| broadleaf | 1 | 32 | 13 | 25 | 23 | 0 | 2 | 674 | 119 | 0 | 0 | 0 | 684 |
| grass weed | 4 | 9 | 3 | 3 | 5 | 0 | 0 | 13 | 3698 | 0 | 0 | 0 | 542 |
| nutsedge | 0 | 0 | 0 | 0 | 0 | 0 | 0 | 1 | 25 | 0 | 0 | 0 | 10 |
| lambsquarters | 0 | 1 | 0 | 0 | 1 | 0 | 0 | 0 | 1 | 0 | 0 | 0 | 4 |
| velvet leaf | 0 | 0 | 0 | 2 | 0 | 0 | 0 | 0 | 0 | 0 | 0 | 0 | 0 |
| not present | 15 | 134 | 88 | 95 | 168 | 3 | 16 | 300 | 581 | 0 | 3 | 0 | 0 |

FIG. 6A

|                 | fscore | precision | recall |
|----------------:|-------:|----------:|-------:|
| broadleaf weed  | 0.493  | 0.580     | 0.428  |
| corn            | 0.339  | 0.333     | 0.345  |
| cotton          | 0.850  | 0.842     | 0.859  |
| grass weed      | 0.840  | 0.816     | 0.865  |
| horseweed       | 0.068  | 0.250     | 0.039  |
| kochia          | 0.000  | 0.000     | 0.000  |
| lambsquarters   | 0.000  | 0.000     | 0.000  |
| morning glory   | 0.391  | 0.381     | 0.402  |
| nutsedge        | 0.000  | 0.000     | 0.000  |
| pigweed         | 0.593  | 0.737     | 0.496  |
| soybean         | 0.900  | 0.878     | 0.923  |
| velvet leaf     | 0.000  | 0.000     | 0.000  |

FIG. 6B

|  | Predicted | | | |
|---|---|---|---|---|
| Actual | soybean | monocot weed | broadleaf weed | not present |
| soybean | 1741 | 20 | 12 | 113 |
| monocot weed | 16 | 3740 | 26 | 560 |
| broadleaf weed | 92 | 205 | 2195 | 1143 |
| not present | 134 | 596 | 673 | 0 |

|  | fscore | precision | recall |
|---|---|---|---|
| soybean | 0.900 | 0.878 | 0.923 |
| monocot weed | 0.840 | 0.820 | 0.861 |
| broadleaf weed | 0.671 | 0.755 | 0.604 |

FIG. 7B

|   | fscore | precision | recall |
|---|--------|-----------|--------|
| soybean | 0.900 | 0.878 | 0.923 |
| grass weed | 0.838 | 0.815 | 0.863 |
| broadleaf weed | 0.671 | 0.755 | 0.604 |
| sedge weed | 0.000 | 0.000 | 0.000 |

Predicted

| | soybean | grass weed | broadleaf weed | sedge weed | not present |
|---|---|---|---|---|---|
| soybean | 1741 | 20 | 12 | 0 | 113 |
| grass weed | 16 | 3715 | 25 | 0 | 550 |
| broadleaf weed | 92 | 205 | 2195 | 0 | 1143 |
| sedge weed | 0 | 25 | 1 | 0 | 10 |
| not present | 134 | 596 | 673 | 0 | 0 |

Actual

FIG. 7C

|  | fscore | precision | recall |
|---|---|---|---|
| soybean | 0.900 | 0.878 | 0.923 |
| grass weed | 0.838 | 0.815 | 0.863 |
| broadleaf weed | 0.624 | 0.684 | 0.573 |
| sedge weed | 0.000 | 0.000 | 0.000 |
| pigweed | 0.593 | 0.737 | 0.496 |

Predicted

| Actual | soybean | grass weed | broadleaf weed | sedge weed | pigweed | not present |
|---|---|---|---|---|---|---|
| soybean | 1741 | 20 | 6 | 0 | 6 | 113 |
| grass weed | 16 | 3715 | 22 | 0 | 3 | 550 |
| broadleaf weed | 53 | 152 | 1594 | 0 | 47 | 1143 |
| sedge weed | 0 | 25 | 1 | 0 | 0 | 10 |
| pigweed | 39 | 53 | 130 | 0 | 424 | 209 |
| not present | 134 | 596 | 578 | 0 | 95 | 0 |

FIG. 7D

PLANT GROUP IDENTIFICATION

CROSS-REFERENCE TO RELATED APPLICATION

This application is a continuation of U.S. application Ser. No. 18/094,927, filed Jan. 9, 2023, now U.S. Pat. No. 11,823,388, which is a continuation of U.S. application Ser. No. 16/995,618, filed Aug. 17, 2020, now U.S. Pat. No. 11,580,718, which claims priority under 35 U.S.C. § 119 (e) to U.S. Provisional Patent Application No. 62/888,948, "Weed Species Identification," filed on Aug. 19, 2019, each of which is incorporated by reference in its entirety.

BACKGROUND

Field of Disclosure

This disclosure relates to identifying and treating plants in a field and, more specifically, to identifying that a group of pixels in an image represent a plant in a plant group and treating the plant based on the identified plant group.

Description of the Related Art

It is difficult to apply treatments to individual plants in a field rather than large areas of the field. To treat plants individually farmers can, for example, manually apply treatment to plants, but this proves labor-intensive and costly when performed at industrial scale. In some cases, farming systems use imaging technology to identify and treat plants in a field (e.g., satellite imaging, color imaging, thermal imaging, etc.). These systems have proven less than adequate in their ability to properly identify an individual plant from a plant group including several species and treat the individual plant according to the plant group.

SUMMARY

A farming machine is configured to move through a field and selectively treat individual plants in the field using various treatment mechanisms. The farming machine treats individual plants by identifying the species of the plants in the field. To do this, the farming machine includes an image sensor that captures images of plants in the field. A control system of the farming machine can execute a plant identification model configured to identify pixels representing one or more species in the images. Locations of the identified species in the images are also determined. Based on the identified species and their locations within the images, the farming machine selectively treats the plants as it moves through the field.

In addition to identifying plants according to their species, the plant identification model can identify plants according to other groupings, such as plant genera, plant families, plant characteristics (e.g., leaf shape, size, or color), or corresponding plant treatments to be applied. In some embodiments, these plant groupings are customizable. This allows a user of the farming machine to form plant groupings which are tailored to the specific plants growing in the field. For example, if the user desires to treat pigweed, the user may instruct the plant identification model to identify and categorize plants as either 'pigweed' or 'not pigweed.' In some embodiments, the plant identification model is specifically trained to identify various types of weeds.

In some embodiments, a plant identification map of the field is generated using the images from the image sensor and the plant identification model. The plant identification map is a map of the field that indicates locations of the plant groups identified by the plant identification model. The map may include additional data that provides insights into cultivating and maintaining the field, such as total area covered by each plant group, total area of the field, the number of identified plants in each plant group, and regions of the field treated by the farming machine.

BRIEF DESCRIPTION OF DRAWINGS

FIG. 5 illustrates a table describing a set of training images, in accordance with an example embodiment.

FIGS. 6A and 6B illustrate performance metrics for a plant identification model trained using the set of training images, in accordance with an example embodiment.

FIGS. 7A-7D illustrate performance metrics of the plant identification model instructed to identify different plant groups, in accordance with example embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

A farming machine includes one or more sensors capturing information about a plant as the farming machine moves through a field. The farming machine includes a control system that processes the information obtained by the sensors to identify the plant. There are many examples of a farming machine processing visual information obtained by an image sensor coupled to the farming machine to identify and treat plants. For example, as described in U.S. patent application Ser. No. 16/126,842 titled "Semantic Segmentation to Identify and Treat Plants in a Field and Verify the Plant Treatments," filed on Sep. 10, 2018.

II. Plant Treatment System

Figure 1A:
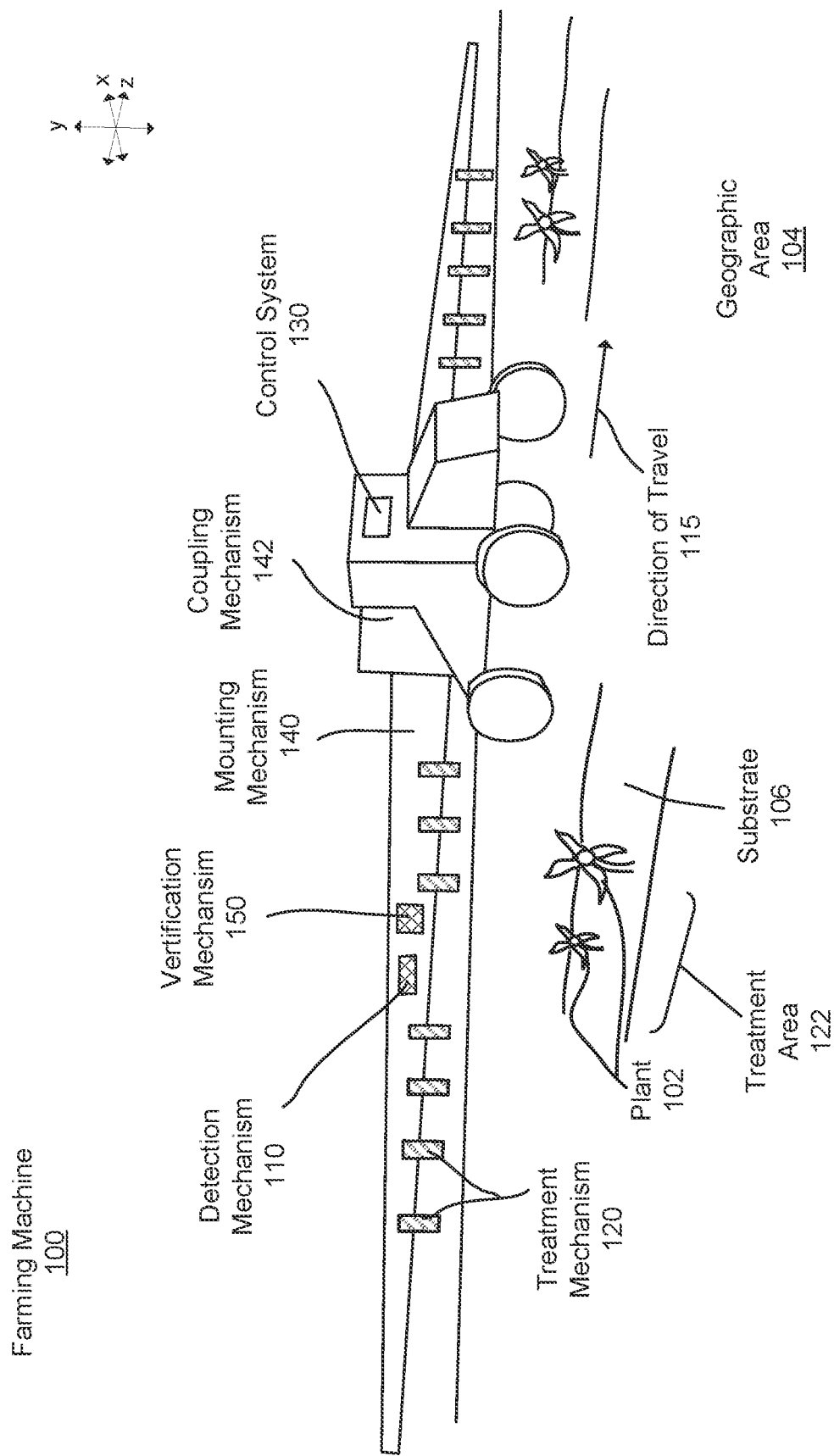
FIG. 1A illustrates an isometric view of a farming machine, in accordance with an example embodiment.
Figure 1B:
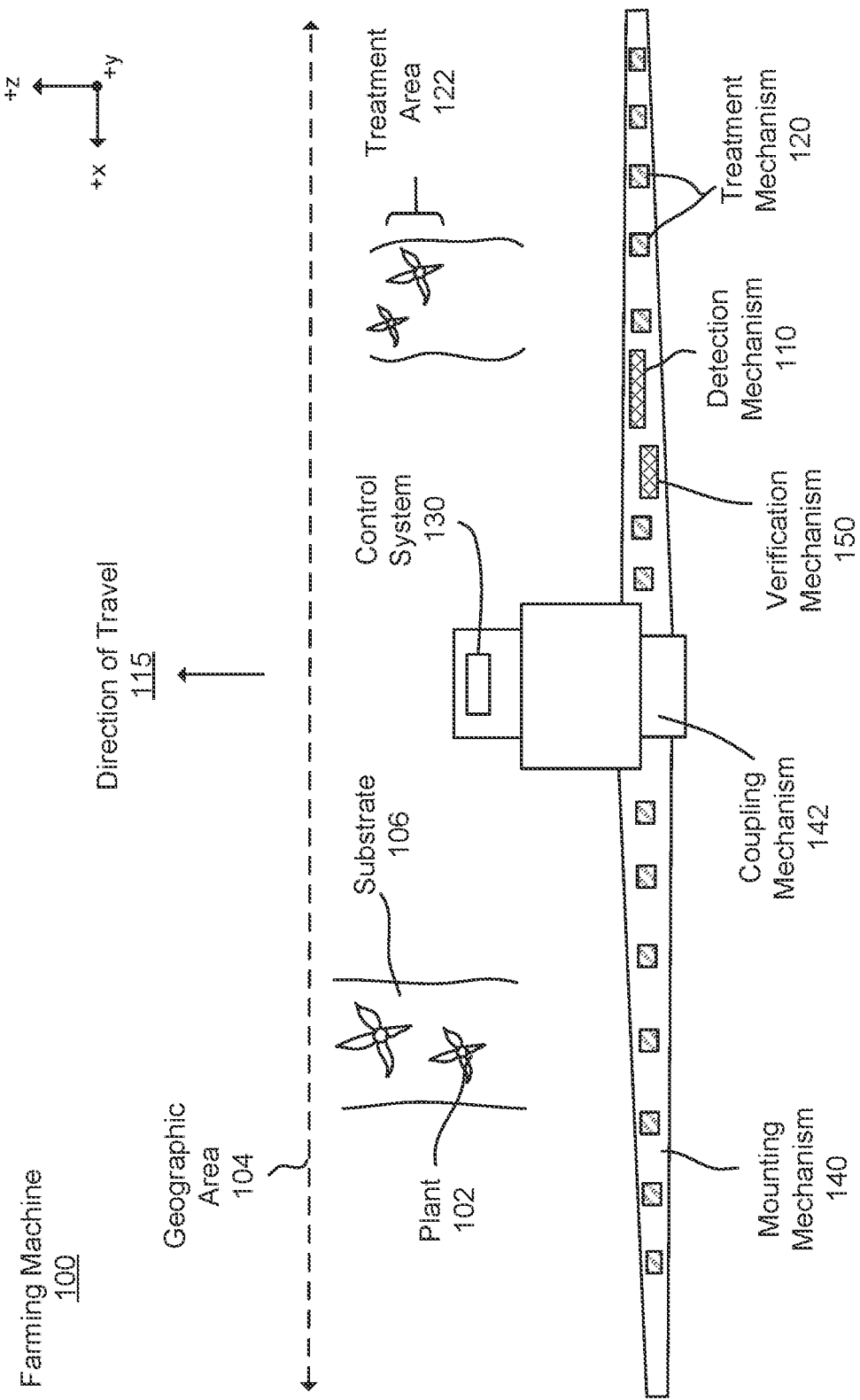
FIG. 1B illustrates a top view of a farming machine, in accordance with the example embodiment.
Figure 1C:
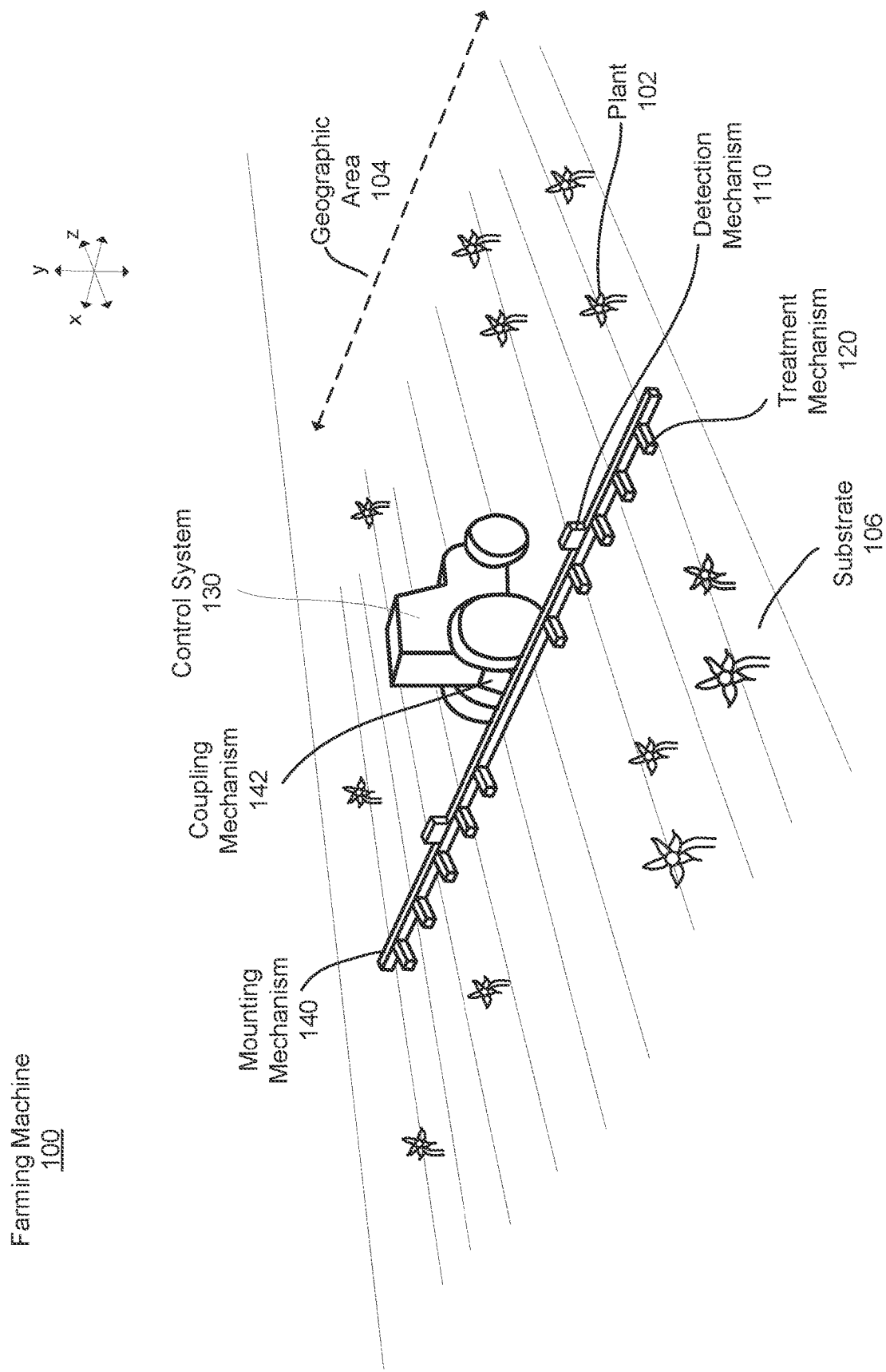
FIG. 1C illustrates an isometric view of a farming machine, in accordance with a second example embodiment.

A farming machine that identifies and treats plants may have a variety of configurations, some of which are described in greater detail below. For example, FIG. 1A is an isometric view of a farming machine and FIG. 1B is a top view of the farming machine of FIG. 1A. FIG. 1C is a second embodiment of a farming machine. Other embodiments of a farming machine are also possible. The farming machine 100, illustrated in FIGS. 1A-1C, includes a detection mechanism 110, a treatment mechanism 120, and a control system 130. The farming machine 100 can additionally include a mounting mechanism 140, a verification mechanism 150, a power source, digital memory, communication apparatus, or any other suitable component. The farming machine 100 can include additional or fewer components than described herein. Furthermore, the components of the farming machine 100 can have different or additional functions than described below.

The farming machine 100 functions to apply a treatment to one or more plants 102 within a geographic area 104. Often, treatments function to regulate plant growth. The treatment is directly applied to a single plant 102 (e.g., hygroscopic material), but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necrosing the plant, necrosing a portion of the plant (e.g., pruning), regulating plant growth, or any other suitable plant treatment. Necrosing the plant can include dislodging the plant from the supporting substrate 106, incinerating a portion of the plant, applying a treatment concentration of working fluid (e.g., fertilizer, hormone, water, etc.) to the plant, or treating the plant in any other suitable manner. Regulating plant growth can include promoting plant growth, promoting growth of a plant portion, hindering (e.g., retarding) plant or plant portion growth, or otherwise controlling plant growth. Examples of regulating plant growth includes applying growth hormone to the plant, applying fertilizer to the plant or substrate, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent to the plant.

The plants 102 can be crops but can alternatively be weeds or any other suitable plant. The crop may be cotton, but can alternatively be lettuce, soybeans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g., same genus, same species, etc.), but can alternatively include multiple crops (e.g., a first and a second crop), both of which are to be treated. Each plant 102 can include a stem, arranged superior (e.g., above) the substrate 106, which supports the branches, leaves, and fruits of the plant. Each plant can additionally include a root system joined to the stem, located inferior to the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil but can alternatively be a sponge or any other suitable substrate.

The detection mechanism 110 is configured to identify a plant for treatment. As such, the detection mechanism 110 can include one or more sensors for identifying a plant. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. In one embodiment, and described in greater detail below, the detection mechanism 110 includes an array of image sensors configured to capture an image of a plant. In some example systems, the detection mechanism 110 is mounted to the mounting mechanism 140, such that the detection mechanism 110 traverses over a geographic location before the treatment mechanism 120 as the farming machine 100 moves through the geographic location. However, in some embodiments, the detection mechanism 110 traverses over a geographic location at substantially the same time as the treatment mechanism 120. In an embodiment of the farming machine 100, the detection mechanism 110 is statically mounted to the mounting mechanism 140 proximal the treatment mechanism 120 relative to the direction of travel 115. In other systems, the detection mechanism 110 can be incorporated into any other component of the farming machine 100.

The treatment mechanism 120 functions to apply a treatment to an identified plant 102. The treatment mechanism 120 applies the treatment to the treatment area 122 as the farming machine 100 moves in a direction of travel 115. The effect of the treatment can include plant necrosis, plant growth stimulation, plant portion necrosis or removal, plant portion growth stimulation, or any other suitable treatment effect as described above. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more working fluids into the substrate 106 adjacent the plant (e.g., within a threshold distance from the plant), or otherwise treating the plant. In one embodiment, the treatment mechanisms 120 are an array of spray treatment mechanisms. The treatment mechanisms 120 may be configured to spray one or more of: an herbicide, a fungicide, water, or a pesticide. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The farming machine 100 may include one or more treatment mechanisms 120. A treatment mechanism 120 may be fixed (e.g., statically coupled) to the mounting mechanism 140 or attached to the farming machine 100 relative to the detection mechanism 110. Alternatively, the treatment mechanism 120 can rotate or translate relative to the detection mechanism 110 and/or mounting mechanism 140. In one variation, the farming machine 100 includes a single treatment mechanism, wherein the treatment mechanism 120 is actuated or the farming machine 100 moved to align the treatment mechanism 120 active area 122 with the targeted plant 102. In a second variation, the farming machine 100 includes an assembly of treatment mechanisms, wherein a treatment mechanism 120 (or subcomponent of the treatment mechanism 120) of the assembly is selected to apply the treatment to the identified plant 102 or portion of a plant in response to identification of the plant and the plant position relative to the assembly. In a third variation, such as shown in FIGS. 1A-1C, the farming machine 100 includes an array of treatment mechanisms 120, wherein the treatment mechanisms 120 are actuated or the farming machine 100 is moved to align the treatment mechanism 120 active areas 122 with the targeted plant 102 or plant segment.

The farming machine 100 includes a control system 130 for controlling operations of system components. The control system 130 can receive information from and/or provide input to the detection mechanism 110, the verification mechanism 150, and the treatment mechanism 120. The control system 130 can be automated or can be operated by a user. In some embodiments, the control system 130 may be configured to control operating parameters of the farming machine 100 (e.g., speed, direction). The control system 130 also controls operating parameters of the detection mechanism 110. Operating parameters of the detection mechanism 110 may include processing time, location and/or angle of the detection mechanism 110, image capture intervals, image capture settings, etc. The control system 130 may be a computer, as described in greater detail below in relation to FIG. 11. The control system 130 can apply one or more models to identify one or more plants in the field. The control system 130 may be coupled to the farming machine 100 such that a user (e.g., a driver) can interact with the control system 130. In other embodiments, the control system 130 is physically removed from the farming machine 100 and communicates with system components (e.g., detection mechanism 110, treatment mechanism 120, etc.) wirelessly. In some embodiments, the control system 130 is an umbrella term that includes multiple networked systems distributed across different locations (e.g., a system on the farming machine 100 and a system at a remote location). In some embodiments, one or more processes are performed by another control system. For example, the control system 130 receives plant treatment instructions from another control system.

In some configurations, the farming machine 100 includes a mounting mechanism 140 that functions to provide a mounting point for the system components. In one example, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame but can alternatively be any other suitable mounting mechanism. In the embodiment of FIGS. 1A-1C, the mounting mechanism 140 extends outward from a body of the farming machine 100 in the positive and negative x-direction (in the illustrated orientation of FIGS. 1A-1C) such that the mounting mechanism 140 is approximately perpendicular to the direction of travel 115. The mounting mechanism 140 in FIGS. 1A-1C includes an array of treatment mechanisms 120 positioned laterally along the mounting mechanism 140. In alternate configurations, there may be no mounting mechanism 140, the mounting mechanism 140 may be alternatively positioned, or the mounting mechanism 140 may be incorporated into any other component of the farming machine 100.

The farming machine 100 includes a first set of coaxial wheels and a second set of coaxial wheels, wherein the rotational axis of the second set of wheels is parallel with the rotational axis of the first set of wheels. In some embodiments, each wheel in each set is arranged along an opposing side of the mounting mechanism 140 such that the rotational axes of the wheels are approximately perpendicular to the mounting mechanism 140. In FIGS. 1A-1C, the rotational axes of the wheels are approximately parallel to the mounting mechanism 140. In alternative embodiments, the system can include any suitable number of wheels in any suitable configuration. The farming machine 100 may also include a coupling mechanism 142, such as a hitch, that functions to removably or statically couple to a drive mechanism, such as a tractor, more to the rear of the drive mechanism (such that the farming machine 100 is dragged behind the drive mechanism), but can alternatively be attached to the front of the drive mechanism or to the side of the drive mechanism. Alternatively, the farming machine 100 can include the drive mechanism (e.g., a motor and drive train coupled to the first and/or second set of wheels). In other example systems, the system may have any other means of traversing through the field.

In some configurations, the farming machine 100 additionally includes a verification mechanism 150 that functions to record a measurement of the ambient environment of the farming machine 100. The farming machine may use the measurement to verify or determine the extent of plant treatment. The verification mechanism 150 records a measurement of the geographic area previously measured by the detection mechanism 110. The verification mechanism 150 records a measurement of the geographic region encompassing the plant treated by the treatment mechanism 120. The verification mechanism 150 measurement can additionally be used to empirically determine (e.g., calibrate) treatment mechanism operation parameters to obtain the desired treatment effect. The verification mechanism 150 can be substantially similar (e.g., be the same type of mechanism as) to the detection mechanism 110 or can be different from the detection mechanism 110. In some embodiments, the verification mechanism 150 is arranged distal the detection mechanism 110 relative the direction of travel, with the treatment mechanism 120 arranged there between, such that the verification mechanism 150 traverses over the geographic location after treatment mechanism 120 traversal. However, the mounting mechanism 140 can retain the relative positions of the system components in any other suitable configuration. In other configurations of the farming machine 100, the verification mechanism 150 can be included in other components of the system.

In some configurations, the farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

Figure 2:
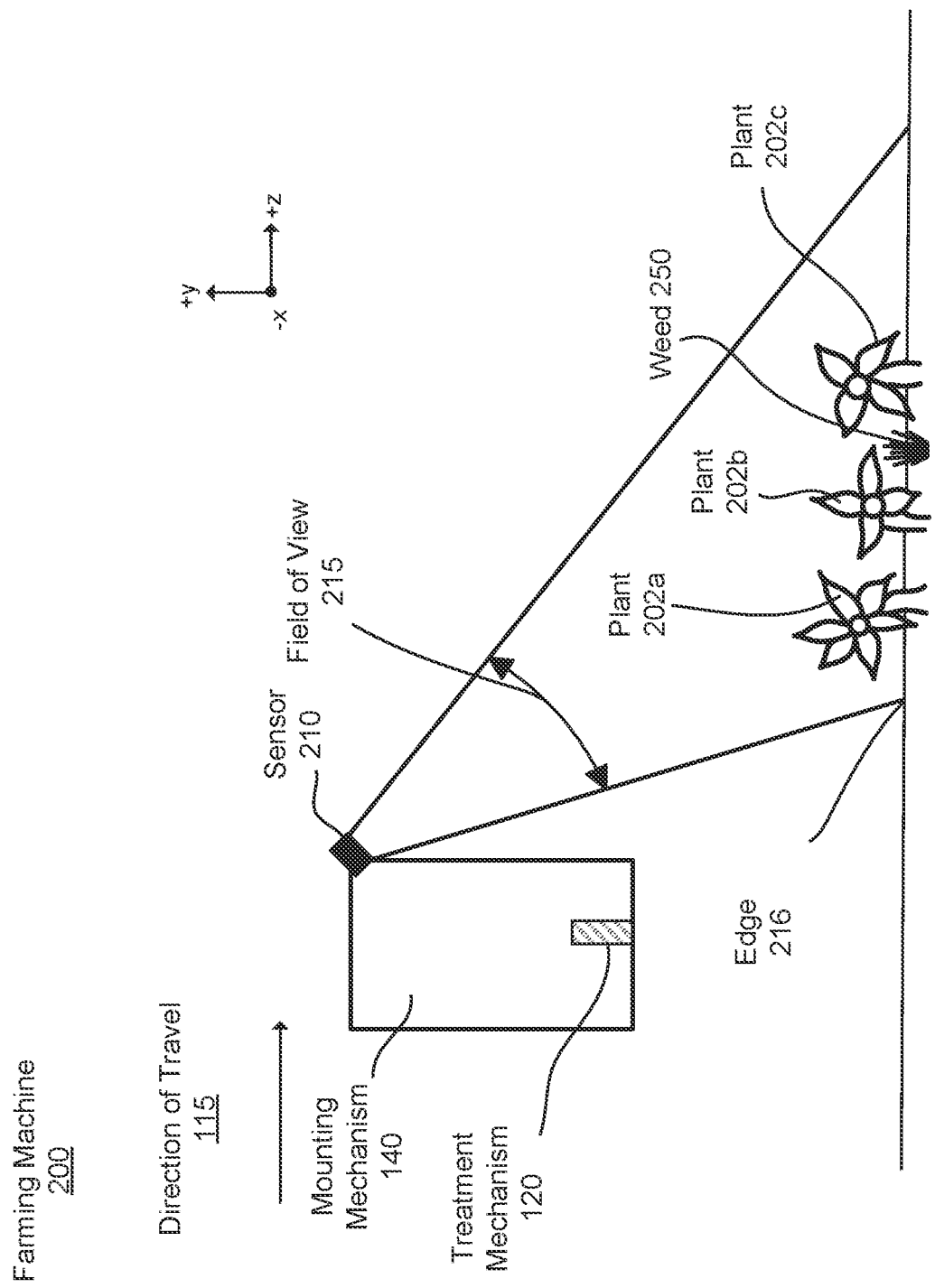
FIG. 2 illustrates a cross-sectional view of a farming machine including a sensor configured to capture an image of one or more plants, in accordance with a first example embodiment.

FIG. 2 illustrates a cross-sectional view of a farming machine including a sensor configured to capture an image of one or more plants, in accordance with some example embodiments. The farming machine 200 may be similar to any of the farming machines described in regard to FIG. 1A-1C. In the embodiment of FIG. 2, the farming machine includes a sensor 210. Here, the sensor 210 is a camera (e.g., RGB camera, near infrared camera, ultraviolet camera, or multi-spectral camera), but could be another type of image sensor suitable for capturing an image of plants in a field. The farming machine 200 can include additional sensors mounted along the mounting mechanism 140. The additional sensors may be the same type of sensor as sensor 210 or different types of sensors.

In FIG. 2, sensor 210 has a field of view 215. The field of view 215, herein, is the angular extent of an area captured by a sensor 210. Thus, the area captured by the sensor 210 (e.g., the field of view 215) may be affected by properties (i.e., parameters) of the sensor 210. For example, the field of view 215 may be based on, for example, the size of the lens and the focal length of the lens. Additionally, the field of view 215 may depend on an orientation of the sensor. For example, an image sensor with a tilted orientation may generate an image representing a trapezoidal area of the field, while an image sensor with a downwards orientation may generate an image representing a rectangular area of the field. Other orientations are also possible.

In FIG. 2, the sensor 210 is tilted. More specifically, the sensor 210 is mounted to a forward region of the mounting mechanism 140, and the sensor 210 is tilted downwards towards the plants. Described herein, a downwards tilt angle is defined as an angle between the z-axis and the negative y-axis. The field of view 215 includes plants 202a, 202b, 202c and weed 250. The distance between the sensor 210 and each plant varies based on the location of the plant and the height of the plant. For example, plant 202c is farther than plant 202a from the sensor 210. The sensor 210 can be tilted in other directions.

FIG. 2 also illustrates a treatment mechanism 120 of the farming machine. Here, the treatment mechanism 120 is located behind the sensor 210 along the z-axis, but it could be in other locations. Whatever the orientation, the sensor 210 is positioned such that the treatment mechanism 120 traverses over a plant after the plant passes through the field of view 215. More specifically, as the farming machine 100 travels towards the plant 202, the plant 202 will exit the field of view 205 at an edge 216 of the field of view nearest the treatment mechanism 120. The distance between the edge 216 and the treatment mechanism 120 is the lag distance. The lag distance allows the control system 130 to capture and process an image of a plant before the treatment mechanism 120 passes over the plant. The lag distance also corresponds to a lag time. The lag time is an amount of time the farming machine has before the treatment mechanism 120 passes over the plant 202. The lag time is an amount of time calculated from farming machine operating conditions (e.g., speed) and the lag distance.

In some configurations, the treatment mechanism 120 is located approximately in line with the image sensor 210 along an axis parallel to the y-axis but may be offset from that axis. In some configurations, the treatment mechanism 120 is configured to move along the mounting mechanism 140 in order to treat an identified plant. For example, the treatment mechanism may move up and down along a y-axis to treat a plant. Other similar examples are possible. Additionally, the treatment mechanism 120 can be angled towards or away from the plants.

In various configurations, a sensor 210 may have any suitable orientation for capturing an image of a plant. Further, a sensor 210 may be positioned at any suitable location along the mounting mechanism 140 such that it can capture images of a plant as a farming machine travels through the field.

III. Plant Group Identification

As described above, a farming machine (e.g., farming machine 200) includes a sensor (e.g., sensor 210) configured to capture an image of a portion of a field (e.g., field of view 215) as the farming machine moves through the field. In some embodiments, the image sensor is not coupled to the farming machine. The farming machine includes a control system (e.g., control system 130) that may be configured to process the image and apply a plant identification model to the image. The plant identification model identifies groups of pixels of that represent plants and categorizes the groups into plant groups (e.g., species). The plant identification may additionally identify and categorize pixels that represent non-plant objects in the field, such as the soil, rocks, field debris, etc. The groups of pixels are labeled as the plant groups and a location of the groups in the image are determined. The control system 130 may be further configured to generate and take treatment actions for the identified plants based on the plant groups and locations.

A plant group includes one or more plants and describes a characteristic or title shared by the one of more plants. Thus, the plant identification model not only identifies the presence of one or more plants in an image, but it may also categorize each identified plant into a plant group that describes the plant. This allows the farming machine to accurately perform farming actions for specific types and/or groups of plants rather than a large array of disparate plants. Examples of plant groups include species, genera, families, plant characteristics (e.g., leaf shape, size, color, noxious, and/or non-noxious), or corresponding plant treatments. In some embodiments, plant groups include subgroups. For example, if a plant group includes a weed group, the weed group may include weed subgroups, such as weed species subgroups (e.g., pigweed and lambsquarters). In another example, weed subgroups include noxious weeds and non-noxious weeds (or less noxious weeds). Similar examples for crop groups are also possible. In these embodiments, the plant identification model can be instructed to classify plants into groups (e.g., crop or weed) and/or subgroups (e.g., pigweed, or lambsquarters).

In some embodiments, the plant identification model is used to perform farming actions at a later point in time. For example, an image sensor (e.g., not on the farming machine) captures images of portions of the field and the plant identification model is applied to the images (e.g., using cloud processing) to identify plant groups in the field prior to the farming machine (e.g., machine 100) moving through the field and treating plants in the field. When it is time to treat plants in the field (e.g., later in the day or on another day), the plant groups and/or instructions for treating the identified plant groups may be provided to the farming machine. Said differently, an image sensor may capture images of portion of the field at a first time and the farming machine may perform farming actions based on the images at a second time, where the second time can occur at any time after the first time.

Figure 3A:
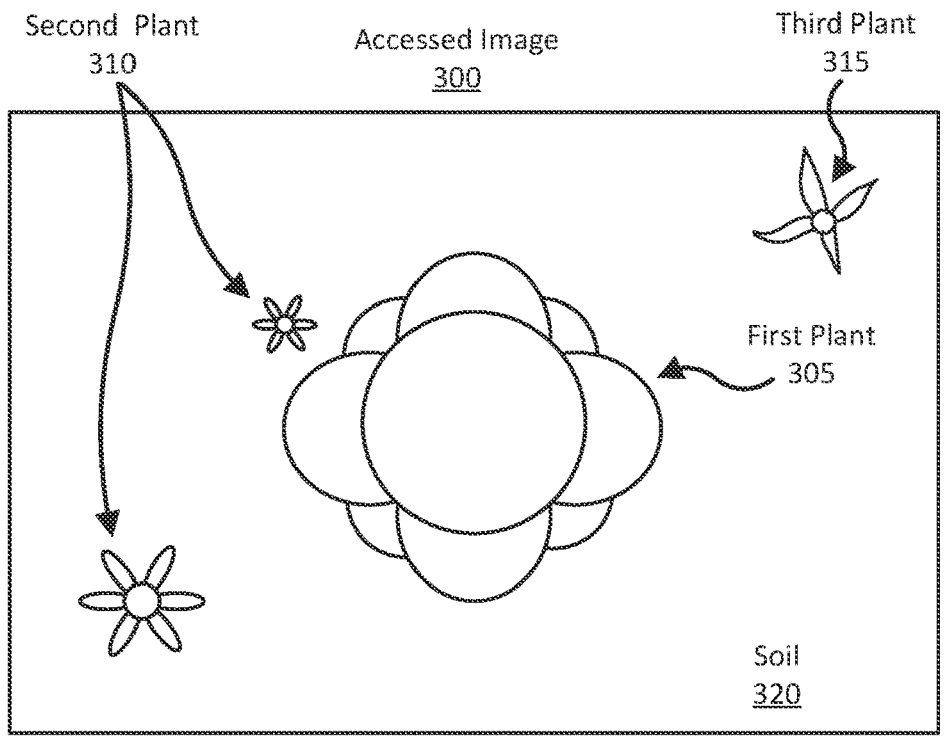
FIG. 3A illustrates a captured image, in accordance with an example embodiment.
Figure 3B:
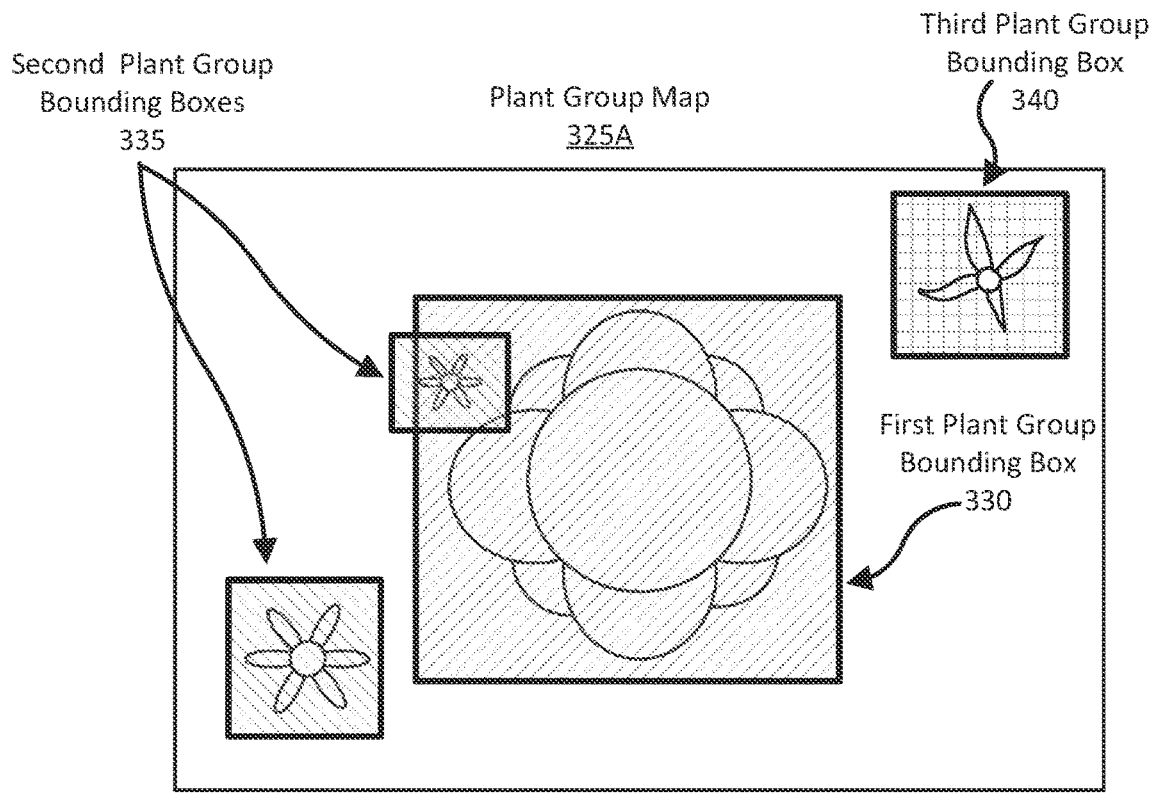
FIG. 3B illustrates a plant group map generated based on the captured image, in accordance with a first example embodiment.

FIG. 3A is an example image 300 accessed by the control system (e.g., captured by a sensor of the farming machine). The image 300 includes pixels representing a first plant 305, a second plant 310, a third plant 315, and soil 320 in the field. FIG. 3B is an illustration of a plant group map 325A produced by applying the plant identification model to the accessed image 300. A plant group map is an image that identifies the locations of one or more plant groups in an accessed image. The plant group map 325A in FIG. 3B was generated by the plant identification model using a bounding box method.

A bounding box method identifies groups of pixels in an accessed image that include a plant group (e.g., first, second, and third plant groups) and places each group of pixels within a bounding box. For example, the plant identification model identifies a group of pixels representing the first plant 305 and labels the group of pixels with a bounding box corresponding to a first plant group. Similarly, the plant identification model encloses pixels of the second plants 310 with second group bounding boxes 335 and encloses pixels of the third plant 315 with a third group bounding box 340. The groups associated with the boxes depend on the groups of the plant identification model. While the bounding boxes in FIG. 3B are rectangular, bounding boxes may take other simple shapes such as triangles or circles.

Since the bounding boxes do not necessarily reflect the actual shapes of the plants, the bounding box method may include pixels that do not represent the plant (e.g., pixels that represent the soil 320, or pixels of other plants). Since a treatment area may correspond to a bounding box area, selected treatment mechanisms for each plant group may be applied to unnecessary areas. For example, if a growth promoter is applied to the first plant group box 330, one of the second plants 310 may also be unintentionally treated with the growth promoter.

Figure 3C:
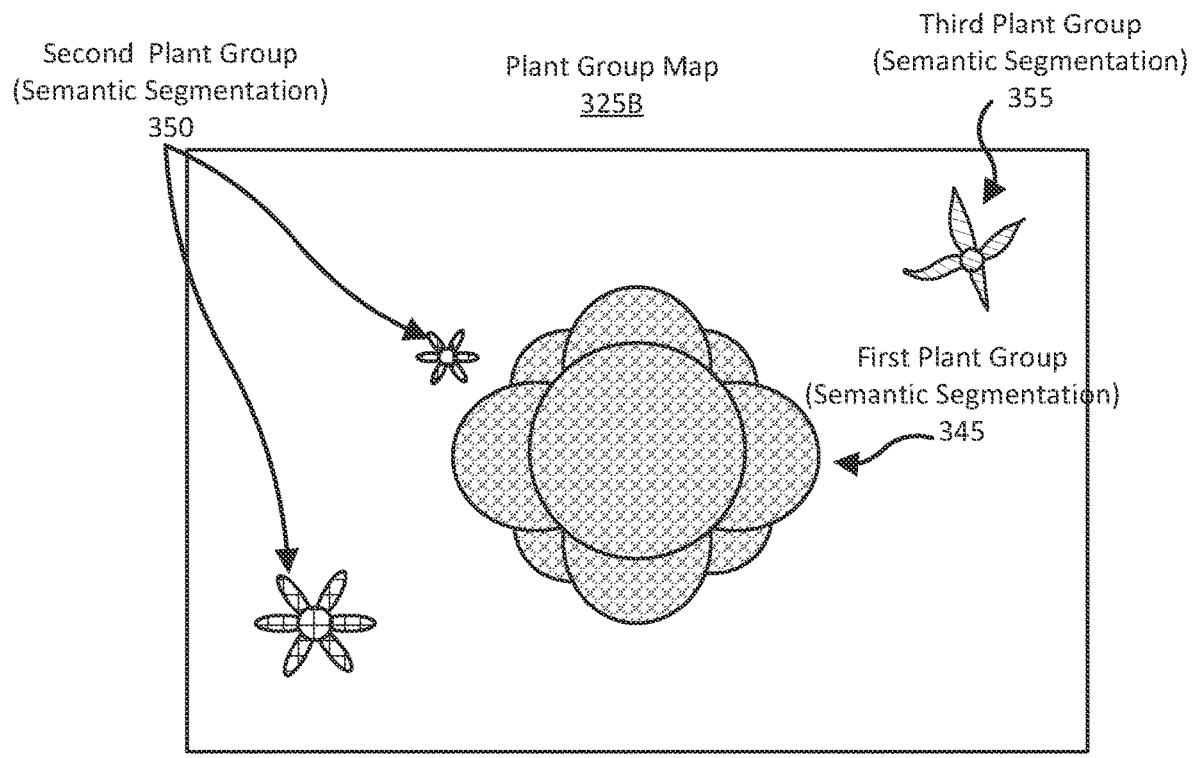
FIG. 3C illustrates a plant group map generated based on the captured image, in accordance with a second example embodiment.

In other embodiments, the plant identification model performs pixelwise semantic segmentation to identify plant groups in an image. Semantic segmentation may be faster and more accurate than the bounding box method. FIG. 3C, is an example of a plant group map 325B generated using a semantic segmentation method to identify plant groups. The plant group map 325B in FIG. 3C illustrates a group of pixels 345 likely to represent the first plant 305, groups of pixels 350 likely to represent the second plants 310, and a group of pixels 355 likely to represent the third plant 315. Compared to the bounding box method, semantic segmentation may be more accurate because the identified groups of pixels can take any complex shapes and are not limited to a bounding box.

Figure 3D:
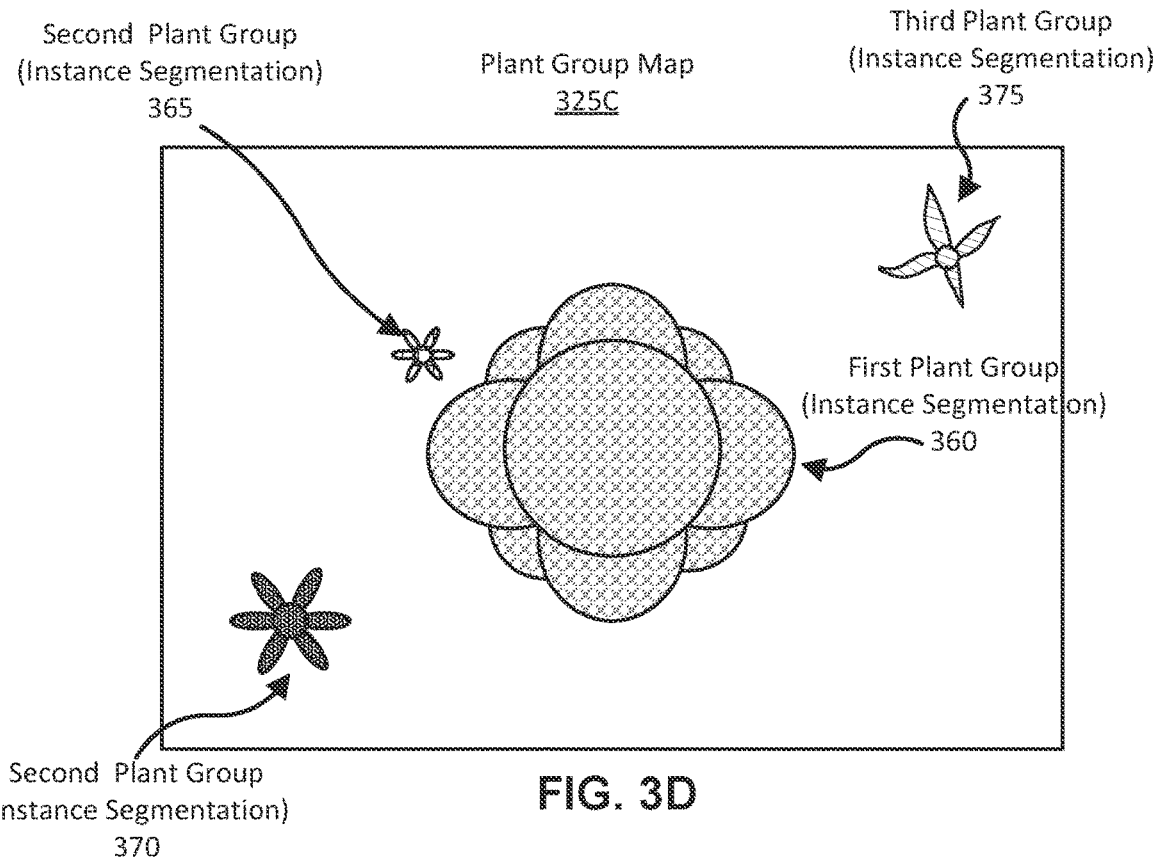
FIG. 3D illustrates a plant group map generated based on the captured image, in accordance with a third example embodiment.

In other embodiments, the plant identification model performs instance segmentation to identify plant groups in an image. Instance segmentation may be more accurate than the semantic segmentation or bounding box method. For example, it may enable the use of loss functions that improve the detection of plants across a wide range of sizes. Additionally, it may provide data on the count of plants per unit area. FIG. 3D is an example of a plant group map 325C generated using a semantic segmentation method to identify plant groups. The plant group map 325C in FIG. 3D illustrates a group of pixels 360 likely to represent the first plant 305, groups of pixels 365 and 370 likely to represent the second plants 310, and a group of pixels 375 likely to represent the third plant 315.

III. A Implementation of a Plant Identification Model

There are several methods to determine plant group information in a captured image. One method of determining plant group information from a captured image is a plant identification model that operates on a fully convolutional encoder-decoder network. For example, the plant identification model can be implemented as functions in a neural network trained to determine plant group information from visual information encoded as pixels in an image. The plant identification model may function similarly to a pixelwise semantic segmentation model where the classes for labelling identified objects are plant groups.

Figure 4:
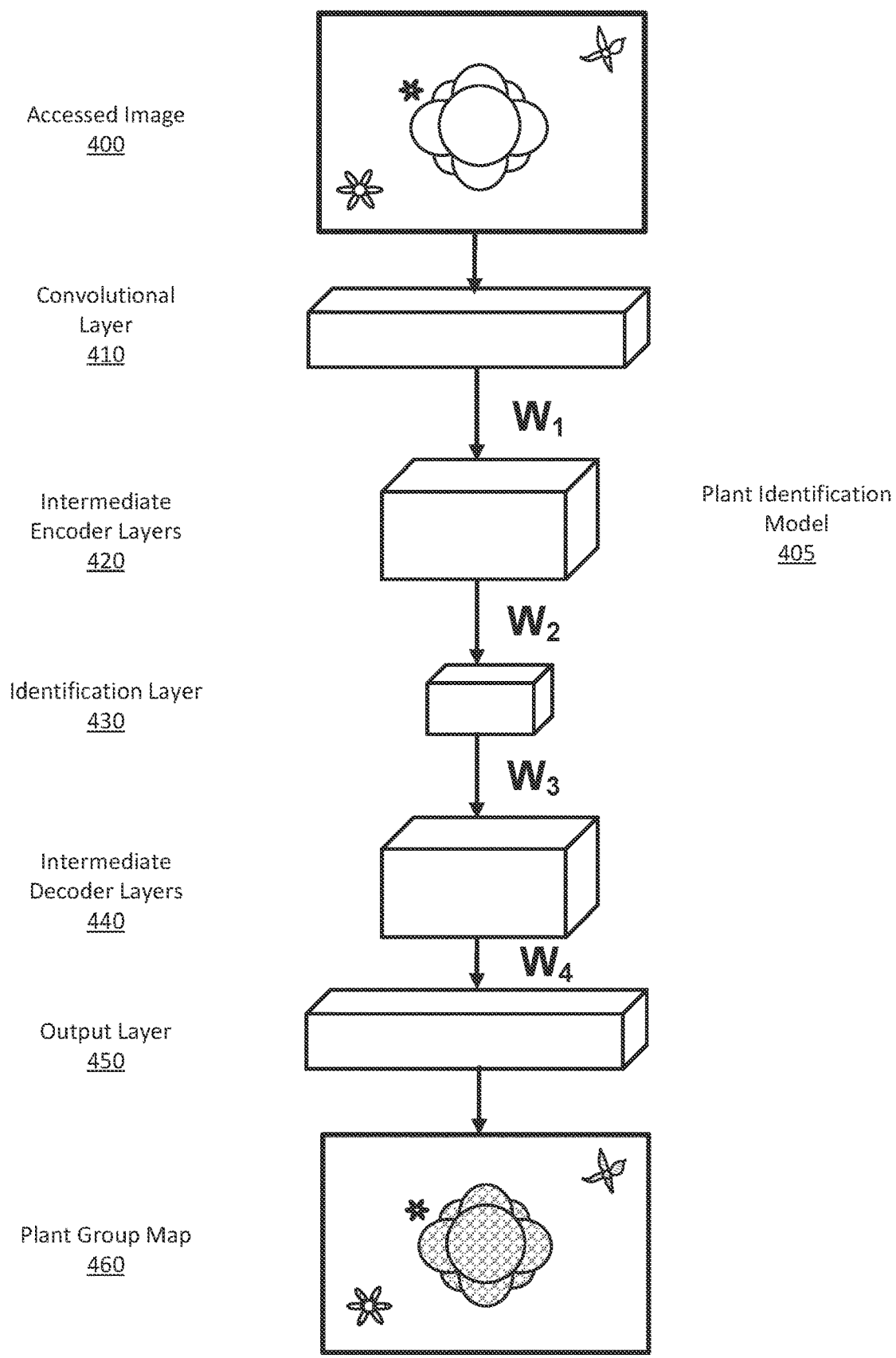
FIG. 4 illustrates a representation of a plant identification model, in accordance with an example embodiment.

Herein, the encoder-decoder network may be implemented by a control system 130 as a plant identification model 405. A farming machine can execute the plant identification model 405 to identify plant groups associated with pixels in an accessed image 400 and quickly generate an accurate plant group map 460. To illustrate, FIG. 4 is a representation of a plant identification model, in accordance with one example embodiment.

In the illustrated embodiment, the plant identification model 405 is a convolutional neural network model with layers of nodes, in which values at nodes of a current layer are a transformation of values at nodes of a previous layer. A transformation in the model 405 is determined through a set of weights and parameters connecting the current layer and the previous layer. For example, as shown in FIG. 4, the example model 405 includes five layers of nodes: layers 410, 420, 430, 440, and 450. The control system 130 applies the function $W_1$ to transform from layer 410 to layer 420, applies the function $W_2$ to transform from layer 420 to layer 430, applies the function $W_3$ to transform from layer 430 to layer 440, and applies the function $W_4$ to transform from layer 440 to layer 450. In some examples, the transformation can also be determined through a set of weights and parameters used to transform between previous layers in the model. For example, the transformation $W_4$ from layer 440 to layer 450 can be based on parameters used to accomplish the transformation $W_1$ from layer 410 to 420.

In an example process, the control system 130 inputs an accessed image 400 (e.g., accessed image 300) to the model 405 and encodes the image onto the convolutional layer 410. After processing by the control system 130, the model 405 outputs a plant group map 460 (e.g., 325A, 325B) decoded from the output layer 450. In the identification layer 430, the control system 130 employs the model 405 to identify plant group information associated with pixels in the accessed image 400. The plant group information may be indicative of plants and other objects in the field and their locations in the accessed image 400. The control system 130 reduces the dimensionality of the convolutional layer 410 to that of the identification layer 430 to identify plant group information in the accessed image pixels, and then increases the dimensionality of the identification layer 430 to generate a plant group map 460 (e.g., 325A, 325B). In some examples, the plant identification model 405 can group pixels in an accessed image 400 based on plant group information identified in the identification layer 430 when generating the plant group map 460.

As previously described, the control system 130 encodes an accessed image 400 to a convolutional layer 410. In one example, a captured image is directly encoded to the convolutional layer 410 because the dimensionality of the convolutional layer 410 is the same as a pixel dimensionality (e.g., number of pixels) of the accessed image 400. In other examples, the captured image can be adjusted such that the pixel dimensionality of the captured image is the same as the dimensionality of the convolutional layer 410. For example, the accessed image 400 may be cropped, reduced, scaled, etc.

The control system 130 applies the model 405 to relate an accessed image 400 in the convolutional layer 410 to plant group information in the identification layer 430. The control system 130 retrieves relevant information between these elements by applying a set of transformations (e.g., $W_1$, $W_2$, etc.) between the corresponding layers. Continuing with the example from FIG. 4, the convolutional layer 410 of the model 405 represents an accessed image 400, and identification layer 430 of the model 405 represents plant group information encoded in the image. The control system 130 identifies plant group information corresponding to pixels in an accessed image 400 by applying the transformations $W_1$ and $W_2$ to the pixel values of the accessed image 400 in the space of convolutional layer 410. The weights and parameters for the transformations may indicate relationships between the visual information contained in the accessed image and the inherent plant group information encoded in the accessed image 400. For example, the weights and parameters can be a quantization of shapes, distances, obscuration, etc. associated with plant group information in an accessed image 400. The control system 130 may learn the weights and parameters using historical user interaction data and labelled images.

In the identification layer 430, the control system maps pixels in the image to associated plant group information based on the latent information about the objects represented by the visual information in the captured image. The identified plant group information can be used to generate a plant group map 460. To generate a plant group map 460, the control system 130 employs the model 405 and applies the transformations $W_3$ and $W_4$ to the plant group information identified in identification layer 430. The transformations result in a set of nodes in the output layer 450. The weights and parameters for the transformations may indicate relationships between the image pixels in the accessed image 400 and a plant groups in a plant group map 460. In some cases, the control system 130 directly outputs a plant group map 460 from the nodes of the output layer 450, while in other cases the control system 130 decodes the nodes of the output layer 450 into a plant group map 460. That is, model 405 can include a conversion layer (not illustrated) that converts the output layer 450 to a plant group map 460.

The weights and parameters for the plant identification model 405 can be collected and trained, for example, using data collected from previously captured visual images and a labeling process. The labeling process increases the accuracy and reduces the amount of time required by the control system 130 employing the model 405 to identify plant group information associated with pixels in an image. The labelling and training process are described in more detail below with reference to FIG. 10.

Additionally, the model 405 can include layers known as intermediate layers. Intermediate layers are those that do not correspond to convolutional layer 110 for the accessed image 400, the identification layer 430 for the plant group information, and an output layer 450 for the plant group map 460. For example, as shown in FIG. 4, layers 420 are intermediate encoder layers between the convolutional layer 410 and the identification layer 430. Layer 440 is an intermediate decoder layer between the identification layer 430 and the output layer 450. Hidden layers are latent representations of different aspects of an accessed image that are not observed in the data but may govern the relationships between the elements of an image when identifying plant groups associated with pixels in an image. For example, a node in the hidden layer may have strong connections (e.g., large weight values) to input values and values of nodes in an identification layer that share the commonality of plant groups. Specifically, in the example model of FIG. 4, nodes of the hidden layers 420 and 440 can link inherent visual information in the accessed image 400 that share common characteristics to help determine plant group information for one or more pixels.

Additionally, each intermediate layer may be a combination of functions such as, for example, residual blocks, convolutional layers, pooling operations, skip connections, concatenations, etc. Any number of intermediate encoder layers 420 can function to reduce the convolutional layer to the identification layer and any number of intermediate decoder layers 440 can function to increase the identification layer 430 to the output layer 450. Alternatively stated, the encoder intermediate layers reduce the pixel dimensionality to the plant group identification dimensionality, and the decoder intermediate layers increase the identification dimensionality to the plant group map dimensionality.

Furthermore, in various embodiments, the functions of the model 405 can reduce the accessed image 400 and identify any number of objects in a field. The identified objects are represented in the identification layer 430 as a data structure having the identification dimensionality. In various other embodiments, the identification layer can identify latent information representing other objects in the accessed image. For example, the identification layer 430 can identify a result of a plant treatment, soil, an obstruction, or any other object in the field.

III.B Example Training Images

As described above, the plant identification model may be a machine learned model that was trained using images of plants in a field. The training images may be an accessed image, or a portion of an accessed image (e.g., bounding boxes that enclose pixels representing the plants). In the former, the training images are larger and may provide more data for training the model. In the latter, the training images are localized to portions of the images and may be faster to label. Whatever the case, the training images include pixels representing plants from plant groups and other objects in the field that can be used to train a plant identification model.

The generation of training images and training the plant identification model is further described with reference to FIG. 10.

In some embodiments, semantic segmentation labels with multiple plant groups may be generated from semantic segmentation labels with fewer plant groups and bounding box labels. For example, bounding box labels corresponding to multiple weed species can be combined with semantic segmentation labels that have a single group for all weeds, in order to generate semantic segmentation labels corresponding to multiple weed species. The initial labels can be combined by intersecting each bounding box with the semantic segmentation label and assigning the intersected portion of the semantic segmentation label to the class of the bounding box. This approach may enable savings of time and money.

FIG. 5 illustrates a table describing an example set of training images. The left column lists plant groups labeled by bounding boxes in the set. In this example, the plant groups are species that include grass weed, broadleaf weed, cotton, soybean, pigweed, morning glory, horseweed/marestail, kochia, maize/corn, nutsedge, lambsquarters, and velvet leaf. The right column lists the total number of images that include each species, and the middle column lists the total number of bounding boxes for each plant group (an image may include multiple plant groups and an image may include multiple plants of a same group).

III. C Example Identification Model

FIG. 6A is a confusion matrix characterizing a plant identification model trained using the training images described with reference to FIG. 5. Each axis lists the plant groups. The x-axis lists plant groups predicted by the model and the y-axis lists the actual plant groups in a set of test images. Thus, each row of the matrix represents the number of instances a plant group was predicted while each column represents the number of instances a plant group was present in the test images. In a confusion matrix, values in the diagonal represent accurate predictions while values in the off diagonals represent prediction errors, such as false negatives and false positives. FIG. 6B is a table listing additional performance metrics of the trained plant identification model, which includes fscore, precision, and recall values. Precision, recall, and fscore are respectively defined as:

$$\text{Precision} = \frac{TP}{TP + FP}, \quad (1)$$

$$\text{Recall} = \frac{TP}{TP + FN}, \quad (2)$$

and $$Fscore = \frac{2(\text{Precision})(\text{Recall})}{\text{Precision} + \text{Recall}}, \quad (3)$$

where TP is the number of true positives, FP is the number of false positives, and FN is the number of false negatives.

The performance metrics in FIGS. 6A and 6B indicate the example plant prediction model is highly effective at identifying cotton, grass weed, and soybean plants with high accuracy and is moderately effective at identifying broadleaf weed and pigweed plants. As previously stated, the metrics in FIGS. 6A and 6B illustrate the performance of an example plant identification model which was trained using the training images described with reference to FIG. 5. The plant identification model as described in this disclosure should not be limited to these performance metric values, or the performance metric values illustrated in subsequent images. For example, the fscore, precision, and recall values for horseweed, kochia, lambsquarters, nutsedge, and velvet leaf in FIG. 6B may be improved by using additional training images that include these plant groups.

III.D Example Plant Groups

As previously described, the plant identification model may identify and classify different plant groups. For example, plants may be grouped according to their species, genus, or family. Plant groups may be predetermined (i.e., the plant identification model is trained with images that include the plant group labels) or groups may be provided to the plant identification model (e.g., by a user) after it is trained. In the latter case, the plant identification model may be trained to identify species (or another type of group), and, after training, the model may be instructed to classify species into specific groups. Example plant groupings are described below with reference to FIGS. 7A-7D. These figures include performance metrics for a plant identification model trained from the images described with reference to FIG. 5.

Figure 7A:
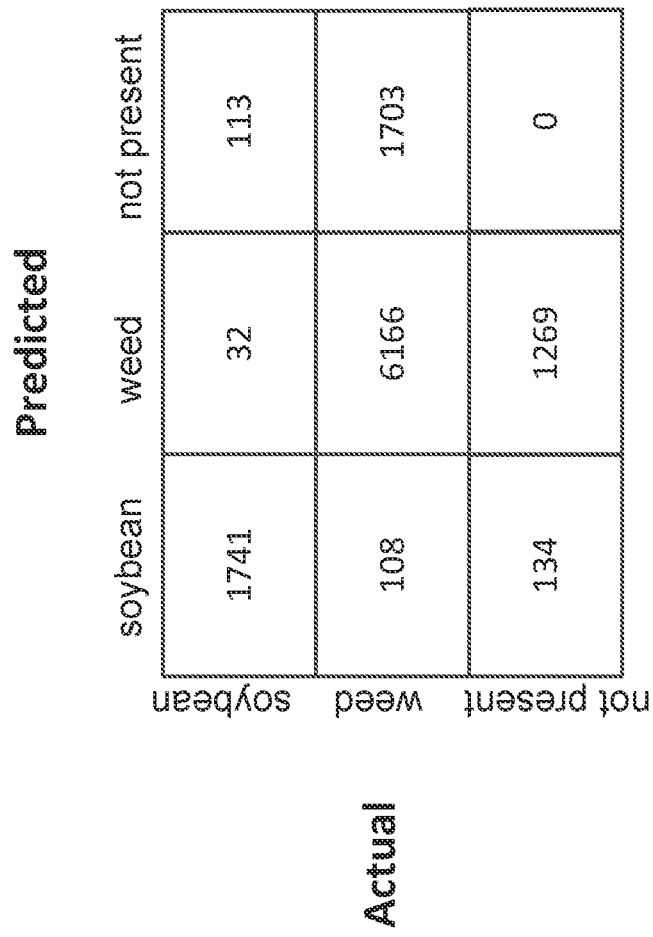

A first example grouping classifies plants as either "crop" or "weed." An example of this grouping is illustrated in FIG. 7A. FIG. 7A illustrates performance metrics for a plant identification model instructed to classify plants as either "soybean" (i.e., the crop) or "weed." In this case, species other than soybeans (e.g., grass weed, broadleaf weed, pigweed, morning glory, horseweed, kochia, nutsedge, lambsquarters, and velvet leaf) are classified as the weed group. In this example, the metrics indicate the model is effective at identifying soybean plants, weeds, and other plants among others.

A second example grouping separates weeds according to a plant characteristic, such as leaf shape, size, and/or color. An example of this grouping is illustrated in FIG. 7B. FIG. 7B illustrates performance metrics for a plant identification model instructed to classify plants as either "soybean," "monocot weed," or "broadleaf weed." In this case, "monocot weed" includes weeds with slender leaves and "broadleaf weed" includes weeds with broad leaves. In this example, the metrics indicate the model is highly effective at identifying soybean plants and monocot weeds and moderately effective at identifying broadleaf weeds among other plants. "Monocot weed," and "broadleaf weed" may be considered subgroups of the "weed" group in FIG. 7A.

A third example grouping is illustrated in FIG. 7C, where the plant identification model is instructed to classify plants as either "soybean," "grass weed," "broadleaf weed," or "sedge weed." In this case, "grass weed" may include grass weed and corn; "broadleaf weed" may include cotton, kochia, lambsquarters, velvetleaf, morning glory, horseweed, pigweed, and broadleaf weed; and "sedge weed" may include nutsedge. This may be useful from a herbicide chemistry perspective since different families of weeds or weed species respond differently to different herbicide chemistry mixes. As an example, the chemistry used to treat grass weeds may be different than that used to treat broadleaf weeds. In this sense one can use a farming machine with different chemical mixes and target the delivery of the chemical based on the detection of the type of weed.

In the example of FIG. 7C, the metrics indicate the model is highly effective at identifying soybean plants and grass weeds and moderately effective at identifying broadleaf weeds. The model's ability to identify sedge weed may be improved by including more images with nutsedge in the training images. In some embodiments, "Grass weed," "broadleaf weed," and "sedge weed" may be considered subgroups of the "weed" group in FIG. 7A.

Pigweed may be classified in a separate group, for example since it is a common weed for a variety of crops (e.g., cotton and soybean) in the United States. An example grouping that does this is illustrated in FIG. 7D. In this example, the metrics indicate the model is highly effective at identifying soybean plants and grass weeds and moderately effective at identifying broadleaf weeds and pigweeds. In some cases, if a user is only interested in identifying pigweed (or any other plant), the plant identification model may be instructed to classify plants as either "pigweed" or "not pigweed," where "not pigweed" includes all other crops and weeds.

In another example grouping, the plant identification model groups plants according to plant treatments that should be applied to the plants. For example, plants may be grouped according to herbicide, pesticide, fungicide, or fertilizer treatments that should be applied to plants in that group. Using the example species from FIG. 5, a first herbicide group may include weeds (e.g., grass weed and lambsquarters) that should be treated with a glyphosate herbicide treatment, a second herbicide group may include weeds (e.g., broadleaf, horseweed, morning glory, and velvet leaf) that should be treated with a dicamba herbicide treatment, and a third herbicide group may include weeds (e.g., pigweed, kochia, and nutsedge) that should be treated with a glufosinate herbicide treatment.

III.E Applying the Plant Identification Model

Figure 8:
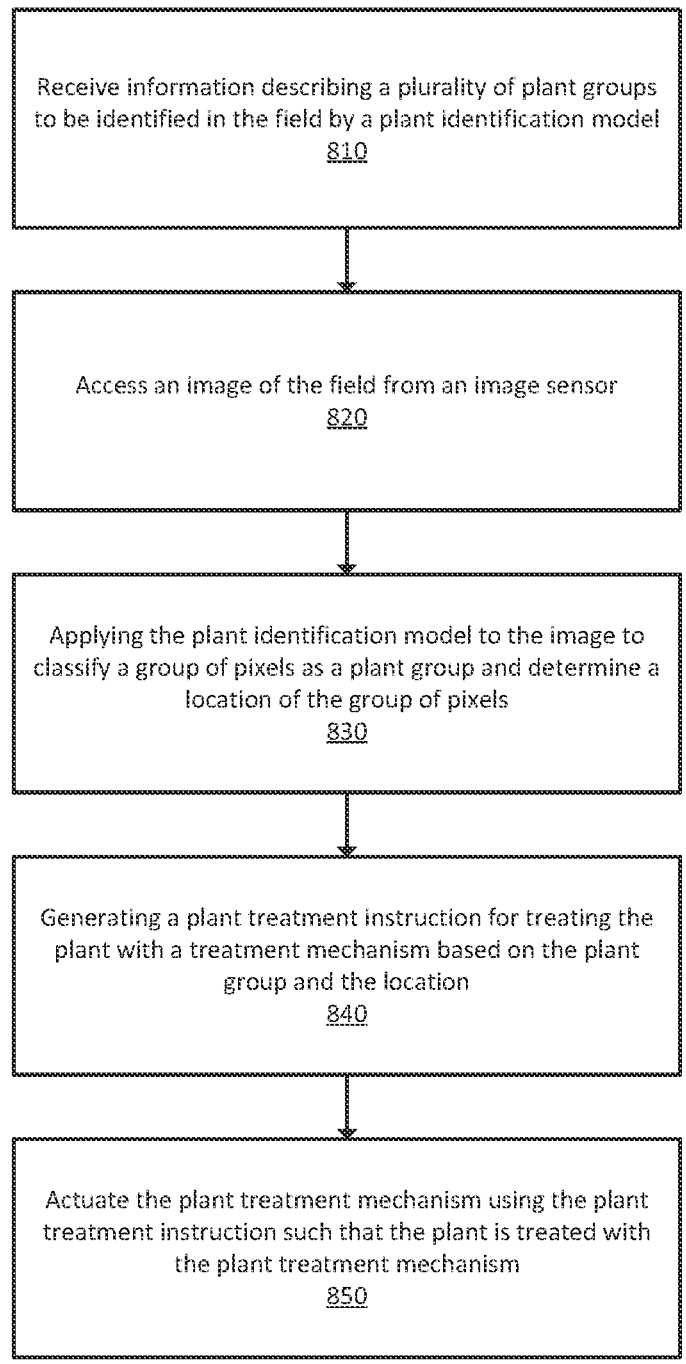
FIG. 8 is a flow chart illustrating a method of treating a plant using a plant identification model, in accordance with an example embodiment.

FIG. 8 illustrates a method for treating a plant in a field, in accordance with one or more embodiments. The method may be performed by a farming machine that moves through the field. The farming machine includes a plurality of treatment mechanisms. The method 800 may be performed from the perspective of the control system 130. The method 800 can include greater or fewer steps than described herein. Additionally, the steps can be performed in different order, or by different components than described herein.

The control system receives 810 information describing plant groups to be identified in the field by a plant identification model. The information may be based on input from a user of the farming machine (e.g., farming machine 100) or one or more sensors (e.g., sensor 210). Each plant group includes one or more plants and the plant groups may correspond to one or more plants planted in the field. The plant groups may describe families, genera, or species of plants in the plant groups. In some embodiments, the plant groups describe plant treatments to be applied to plants in the plant groups. For example, each plant group describes a herbicide, pesticide, fungicide, or fertilizer treatment to be applied to plants in the plant group. In other embodiments, the plant groups describe a plant characteristic (e.g., leaf shape, size, or leaf color) shared by plants in each plant group.

The control system accesses 820 an image of the field from an image sensor. The image sensor may be coupled to the farming machine as it moves through the field. The image includes a group of pixels representing the plant. The control system applies 830 the plant identification model to the image. The plant identification model determines that the group of pixels representing the plant is a plant in a plant group, classifies the group of pixels representing the plant as the plant group, and determines a representative location of the classified group of pixels. The control system generates 840 a plant treatment instruction for treating the plant with a treatment mechanism based on the classified plant group and the representative location. The control system actuates 850 the plant treatment mechanism using the plant treatment instruction such that the plant is treated with the plant treatment mechanism as the farming machine moves past the plant in the field. In some embodiments, the image of the field is captured by the image sensor at a first time and the plant treatment mechanism is actuated at a second time after the first time. The second time may be any time after the first time.

III.F Training a Plant Identification Model

Figure 9:
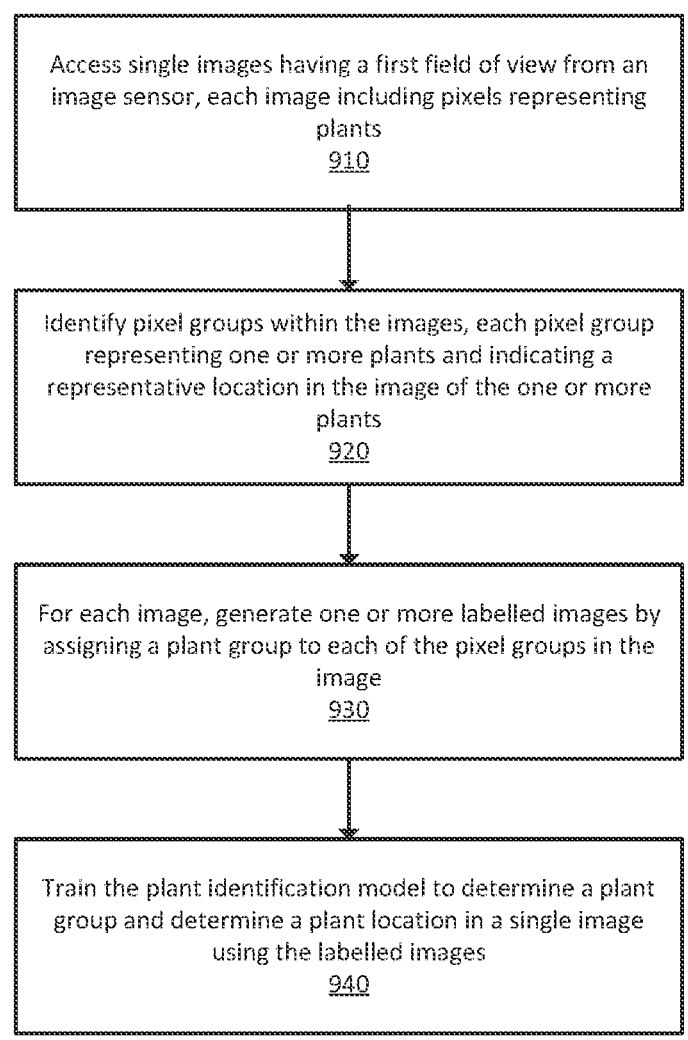
FIG. 9 is a flow chart illustrating a method of training a plant identification model, in accordance with an example embodiment.

FIG. 9 illustrates a method of training a plant identification model, in accordance with one or more embodiments. The method 900 may be performed from the perspective of the control system 130. The method 900 can include greater or fewer steps than described herein. Additionally, the steps can be performed in different order, or by different components than described herein.

The control system 130 accesses 910 a group of images with pixels representing one or more plants. The images have a field of view from an image sensor. The image sensor may be attached to a farming machine as the farming machine travels past plants in a field. The control system 130 identifies 920 a plurality of pixel groups within the images. Each pixel group represents one or more plants and indicates a representative location in the image of the one or more plants.

For each image in the group of images, the control system 130 generates 930 one or more labelled images by assigning a plant group to each of the pixel groups in the image. For example, bounding boxes are placed around the pixel groups and plant group labels are assigned to the boxes. In another example (e.g., for a pixel segmentation model), individual pixels in the pixel groups are identified and assigned to plant group labels. To label the images, the control system 130 may receive input from one or more users who view the images and identify plant groups in the bounding boxes. For example, an agronomically trained user identifies a species of each plant represented by a pixel group in a bounding box. In some embodiments, the labelled images include labels for groups of pixels representing non-plant objects in the field, such as the soil, rocks, field debris, etc. For example, these non-plant objects are labelled by assigning "non-plant object" to the pixels representing them.

The control system 130 trains 940 the plant identification model to determine (e.g., identify) a plant group and determine a plant location in a single image using the group of labelled images. The plant identification model is trained by associating the images with the labelled images. For example, functions of a neural network are trained to associate a label of a labeled image with a group of pixels in a corresponding unlabeled image. As previously stated, the plant identification model may be instructed to identify specific plant groups during operation of the farming machine. In some cases, the plant identification model is instructed to identify plant groups which are different from the groups in the labeled images from which it was trained. For example, the plant identification model is instructed to identify genera, but the model was trained to identify species. In these cases, plant identification model may form clusters of plant groups that correspond to the groups specified in the instructions. Continuing the previous example, the model may form groups of species that correspond to genera. By doing this the plant identification model can identify species according to its training and then group the identified species into the genera groups.

In some cases, if a user prioritizes identification of one plant group over another, the plant identification model may be instructed to deliver higher performance with respect to a certain metric for a specific plant group. For example, when using a semantic segmentation plant identification model that classifies pixels in an image as either "pigweed," "weed other than pigweed," and "not a weed," a user may want to prioritize recall for "pigweed" relative to recall for "weed other than pigweed" and recall for "not a weed." In this example, the plant identification model may be trained with a loss function such as asymmetric loss, and use parameters that prioritize recall for "pigweed," such as by using a higher beta value for "pigweed" than for "weed other than pigweed" and "not a weed." In some embodiments, it may be important to identify noxious weed species. In these embodiments, the loss function may be adjusted to penalize identification mistakes on noxious weeds more heavily than less noxious or non-noxious weeds. Thus, the plant identification model may be tuned to perform more accurately on noxious weeds, which may reduce the change that noxious weeds will compete with the crop.

The control system 130 can train the plant identification model periodically during operation of the farming machine, at a determined time, or before the plant identification model is implemented on a farming machine. Additionally, the plant identification model can be trained by another system such that the plant identification model can be implemented on a control system of a farming machine as a standalone model.

IV. Plant Identification Map

In some embodiments, a plant identification map of a field is generated. The plant identification map may be a spatially indexed geographical map of the field that indicates locations of plant groups which were identified by the plant identification model. Among other advantages, the plant identification map provides insights into cultivating and maintaining the field. FIG. 10 illustrates an example plant identification map 1000. The map 1000 provides an overhead real-world view of a field that includes 3 rows of a crop (the first plant group 1005) along with weeds scattered between the rows (the second plant group 1010 and third plant group 1015). Although not indicated in FIG. 10, one or more of the groups may be highlighted to assist a user to recognize the locations of plant groups in the field. The plant identification map may also indicate types of treatment actions applied to regions of the field (e.g., based on the classified plant groups and their locations). The example of FIG. 10 indicates treatment area 1020A where a first herbicide was applied to second plant groups 1010 and treatment area 1020B where a second herbicide was applied to third plant groups 1015. The plant identification map 1000 thus allows a user to visualize where plant treatments actions were applied in the field.

The control system 130 may generate the map 1000 by combining accessed images or plant group maps from the plant identification model. The map 1000 may be generated after the farming machine passes through the field and applies treatment actions to the plants in the field. The images may be combined as follows. Each image sensor's extrinsic parameters (e.g., position and orientation) may be known with respect to a GPS receiver, along with the sensor's intrinsic parameters (e.g., sensor parameters and distortion parameters). Given these parameters, the pixels in an image can be associated or mapped to a geographic location on a ground plane. Each image may be mapped to a ground plane and the geographic coordinates of each image are computed. Once the geospatial coordinates of each image are known, then the pixels may be placed on a digital map representing the geographical area that was imaged by the farming machine.

Since the farming machine may include different image sensors (e.g., a visible wavelength camera and an IR camera), the plant identification map may include different layers (not shown in FIG. 10) formed by images from each sensor (e.g., a visible wavelength layer and an IR layer). Through a user interface, a user may view one or more layers at once, e.g., the IR layer is overlaid on the visible wavelength layer. Other layers can include plant group identifications of the plant identification model, the spray areas where farming treatments were applied by the farming machine (e.g., areas 1020), or layers derived after the fact like ground truth layers identifying the actual locations of crop and weed species, or other layers related to the operation of the machine (e.g. dusty images or other factors which may affect the operation of the machine).

Color schemes may be applied to an identification map 1000 in order to highlight plant groups in the field. For example, the soil is grayed out and each plant group is highlighted by a different color. In another example, only a single plant group is highlighted so that the group is quickly identified. In some embodiments, the plant identification map is a heat map, where colors of the map indicate spatial densities of plant groups in the field.

Figure 10:
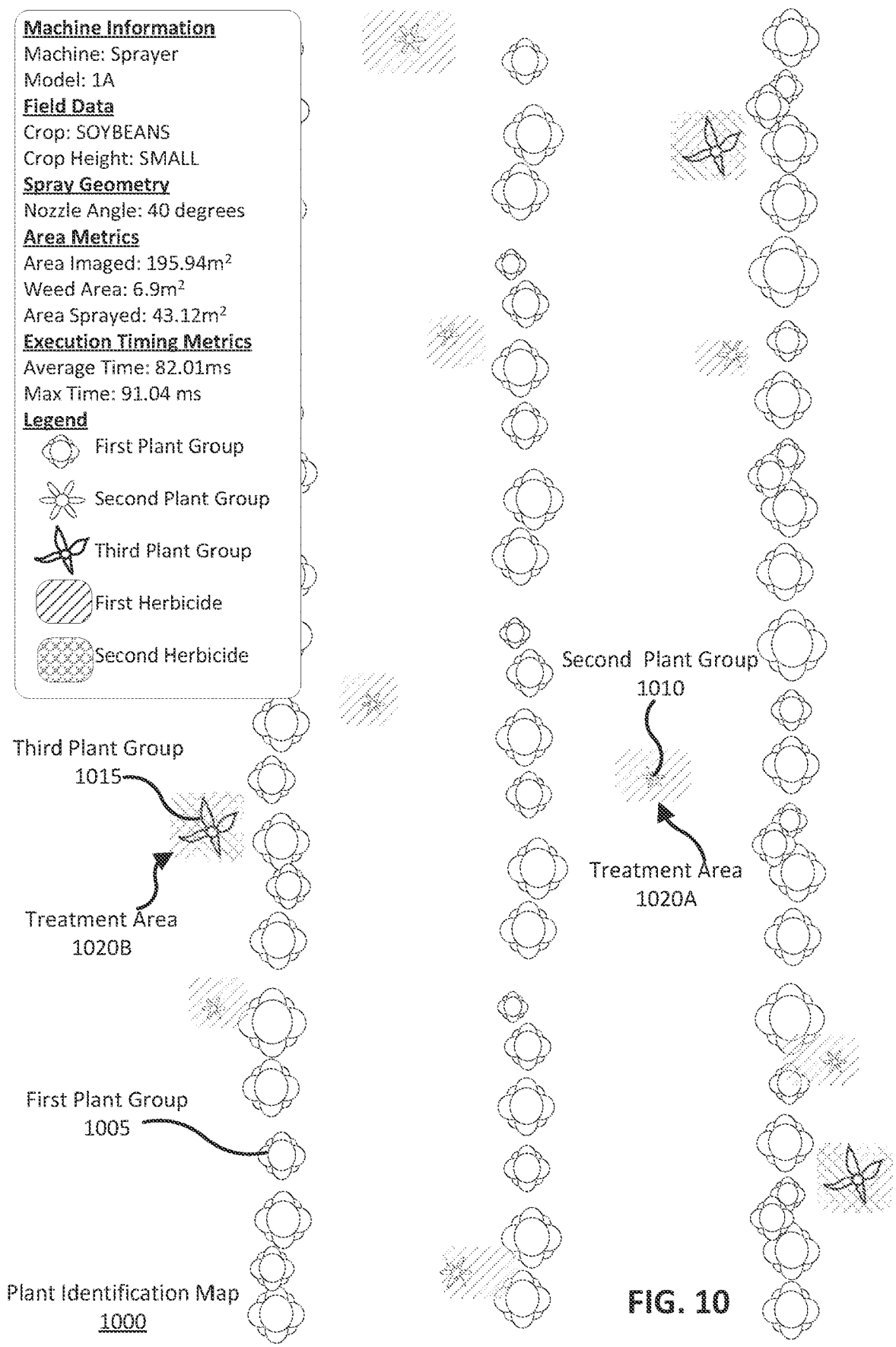
FIG. 10 illustrates a plant identification map, in accordance with an example embodiment.

As indicated in FIG. 10, metrics may be overlaid on the plant identification map 1000 such as farming machine information, field data, treatment mechanism metrics (referred to as "spray geometry" in FIG. 10), area metrics, and timing metrics. Farming machine information describes information associated with the farming machine, such as the farming machine type and model. Field data information describes information associated with the crop in the field, such as the crop (e.g., species) in the field and the crop's size (e.g., height). Treatment mechanism metrics describe the orientation and positions of the machine's treatment mechanisms. In the example of FIG. 10, the farming machine includes a spray nozzle oriented at 40 degrees. Area metrics describe field and plant group metrics, such as the total area imaged by the farming machine, total number of identified plants (not shown in FIG. 10), total number of identified plant groups (not shown in FIG. 10), total weed group area identified by the plant identification model, and total area sprayed by the treatment mechanisms. Timing metrics describe latencies (e.g., averages and maximum) of the farming machine, such as the time taken to capture an image of a plant, classify the plant into a plant group, determine a treatment, and apply the treatment to the plant. Another metric of interest may be the accuracy of the farming machine in spraying weeds, for example, computed by comparing the spray locations identified by the machines with the locations of weeds identified in a "truth" layer. The truth layer is formed by a labeler providing labels for plant groups (not typically done during the operation of the farming machine).

V. Treating Plants Using Plant Groups

As described above, a farming machine can employ a control system 130 executing a plant identification model to classify plants into plant groups and determine locations of the plant groups. The farming machine may then treat the plant based on their plant groups and their locations. When treating plants, the control system 130 can determine one or more treatment actions for the identified plant groups. As previously described, treatment actions can include, for example, actuating a treatment mechanism, modifying a treatment parameter, modifying an operational parameter, and modifying a sensor parameter.

In some embodiments, determining a treatment action includes generating a treatment map. A treatment map is a data structure that associates plant groups in a plant group map (e.g., map 325) with treatment actions. For example, a treatment map includes plant group segmentations (e.g., 345, 350, and 355) which are binned according to predetermined treatment actions. Those treatment actions may be performed by a treatment mechanism only able to treat a specific area of the field. Therefore, specific segmentations are linked to specific treatment mechanisms.

In some embodiments, a treatment map has a field of view that corresponds to the field of view of an accessed image (e.g., image 300) and portions of the field of view correspond to a treatment mechanism that performs a treatment action. Thus, when a portion of the field of view includes a plant to be treated with a treatment action, a corresponding treatment mechanism will be used to treat the plant.

The control system 130 may generate a treatment map when employing the method 800. The control system 130 interprets and translates the data structure of a treatment map into the machine signals necessary to accomplish a treatment action at an appropriate time. Thus, the control system 130 can implement treatment actions to treat plants (or other objects) in the field. An example of generating a treatment map to treat an identified plant is disclosed in U.S. patent application Ser. No. 16/126,842 titled "Semantic Segmentation to Identify and Treat Plants in a Field and Verify the Plant Treatments," filed on Sep. 10, 2018, which is incorporated by reference herein in its entirety, but other methods of generating a treatment map are also possible.

VIII. Control System

Figure 11:
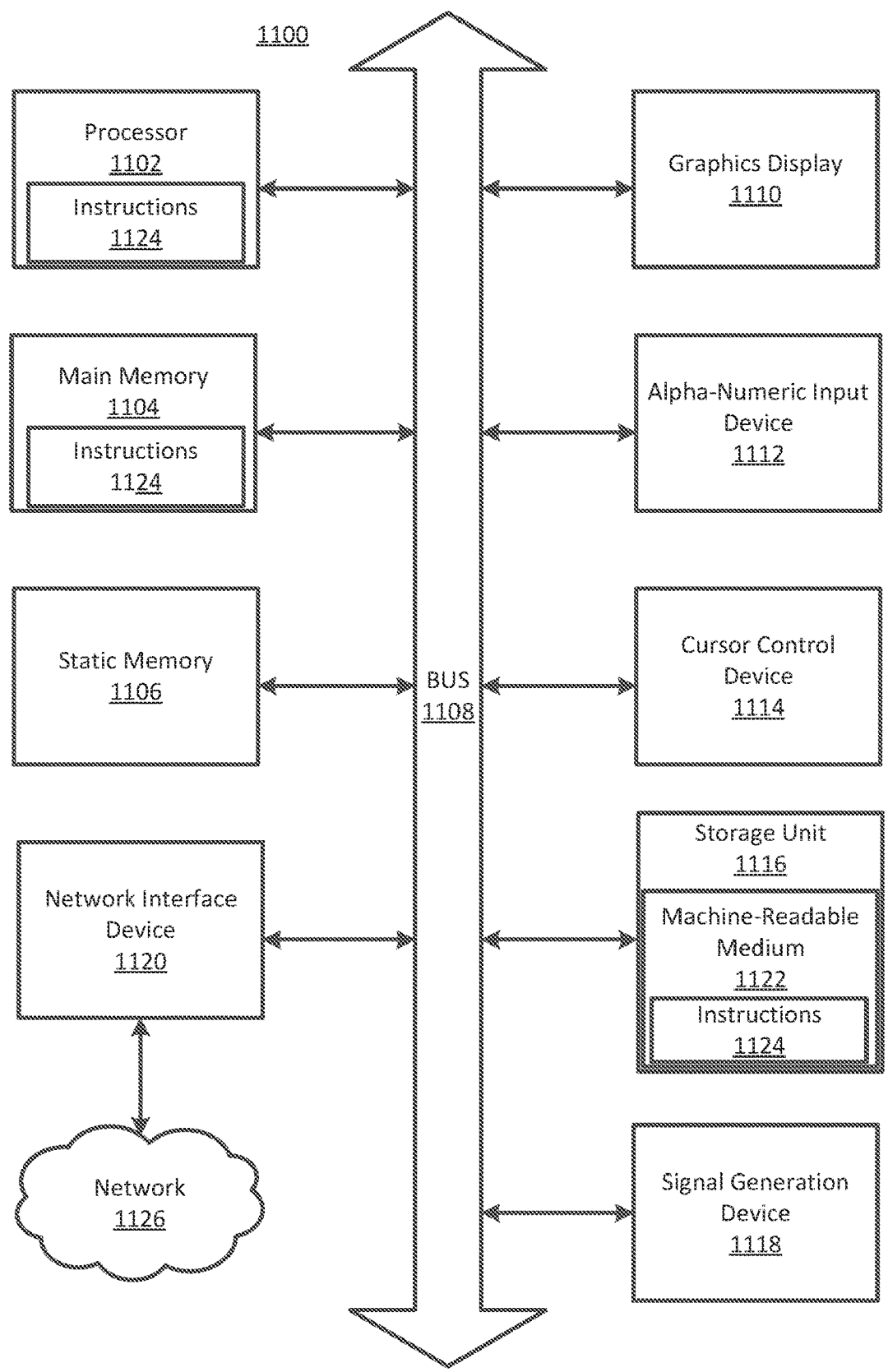
FIG. 11 is a schematic illustrating a control system, in accordance with an example embodiment.

FIG. 11 is a block diagram illustrating components of an example machine for reading and executing instructions from a machine-readable medium. Specifically, FIG. 11 shows a diagrammatic representation of control system 130 in the example form of a computer system 1100. The computer system 1100 can be used to execute instructions 1124 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes one or more processing units (generally processor 1102). The processor 1102 is, for example, a central processing unit (CPU), a graphics processing unit (GPU), a digital signal processor (DSP), a control system, a state machine, one or more application specific integrated circuits (ASICs), one or more radio-frequency integrated circuits (RFICs), or any combination of these. The computer system 1100 also includes a main memory 1104. The computer system may include a storage unit 1116. The processor 1102, memory 1104, and the storage unit 1116 communicate via a bus 1108.

In addition, the computer system 1100 can include a static memory 1106, a graphics display 1110 (e.g., to drive a plasma display panel (PDP), a liquid crystal display (LCD), or a projector). The computer system 1100 may also include alphanumeric input device 1112 (e.g., a keyboard), a cursor control device 1114 (e.g., a mouse, a trackball, a joystick, a motion sensor, or other pointing instrument), a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. For example, the instructions 1124 may include the functionalities of modules of the system 130 described in FIG. 2. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 may be transmitted or received over a network 1126 via the network interface device 1120.

IX. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method comprising:
   receiving information specifying (1) a plurality of plant groups to be identified by a plant identification model and (2) treatments to be applied to plants in plant groups of the plurality of plant groups;
   accessing the plant identification model, the plant identification model being a trained model, wherein the received information is received after the plant identification model was trained;
   accessing an image comprising a plant;
   applying the plant identification model to the image comprising the plant, the plant identification model configured to:
      determine that the plant is in a plant group of the plurality of plant groups described in the received information; and
      determine a representative location of the plant in the image;
   generating a plant treatment instruction for treating the plant with a plant treatment mechanism based on the received information describing a treatment to be applied to plants in the determined plant group and the representative location; and
   actuating the plant treatment mechanism using the plant treatment instruction to treat the plant.

2. The method of claim 1, wherein the plant identification model is trained with images that include plant group labels.

3. The method of claim 1, wherein the plant identification model is trained to identify plant species.

4. The method of claim 1, wherein the plant groups are customized according to a set of plants growing in a first field.

5. The method of claim 1, wherein the plant identification model is configured to use a bounding box method, a pixelwise semantic segmentation method, or an instance segmentation method.

6. The method of claim 1, wherein the plant identification model is further configured to identify non-plant objects.

7. The method of claim 1, wherein the plant identification model is a trained convolutional encoder-decoder network.

8. The method of claim 1, wherein:
the image comprises the plant and a plurality of other plants; and
the plant identification model is further configured to:
   determine plant groups for plants of the plurality of other plants; and
   determine representative locations of plants of the plurality of other plants in the image.

9. The method of claim 8, further comprising:
generating plant treatment instructions for treating plants of the plurality of other plants based on the received information describing treatments to be applied to plants in plant groups and the representative locations of plants of the plurality of other plants.

10. The method of claim 1, wherein the received information is based on input from a sensor.

11. The method of claim 1,
further comprising instructing, after the plant identification model is trained, the plant identification model according to the received information,
wherein the plant identification model is applied to the image comprising the plant after the plant identification model is trained.

12. The method of claim 1, wherein the received information is based on user input specifying (1) and (2).

13. The method of claim 1, further comprising: after the information is received, instructing the plant identification model to identify plants of the plant groups specified by the received information.

14. A machine comprising:
a plurality of plant treatment mechanisms for treating plants as the machine travels past the plants in an environment; and
a control system configured to:
   receive information specifying (1) a plurality of plant groups to be identified by a plant identification model and (2) treatments to be applied to plants in plant groups of the plurality of plant groups;
   accessing the plant identification model, the plant identification model being a trained model, wherein the received information is received after the plant identification model was trained;
   access an image comprising a plant;
   apply the plant identification model to the image comprising the plant, the plant identification model configured to:
      determine that the plant is in a plant group of the plurality of plant groups described in the received information; and
      determine a representative location of the plant in the image;
   generate a plant treatment instruction for treating the plant with a plant treatment mechanism of the plurality of plant treatment mechanisms based on the received information describing a treatment to be applied to plants in the determined plant group and the representative location; and
   actuate the plant treatment mechanism using the plant treatment instruction to treat the plant.

15. The machine of claim 14, wherein the plant identification model is trained with images that include plant group labels.

16. The machine of claim 14, wherein the plant identification model is trained to identify plant species.

17. The machine of claim 14, wherein the plant groups are customized according to a set of plants growing in a first field.

18. The machine of claim 14, wherein the plant identification model is configured to use a bounding box method, a pixelwise semantic segmentation method, or an instance segmentation method.

19. A non-transitory computer readable storage medium comprising instructions that, when executed by a computing system, cause the computing system to perform operations comprising:
receiving information specifying (1) a plurality of plant groups to be identified by a plant identification model and (2) treatments to be applied to plants in plant groups of the plurality of plant groups;
accessing the plant identification model, the plant identification model being a trained model, wherein the received information is received after the plant identification model was trained;
accessing an image comprising a plant;
applying the plant identification model to the image comprising the plant, the plant identification model configured to:
   determine that the plant is in a plant group of the plurality of plant groups described in the received information; and
   determine a representative location of the plant in the image;
generating a plant treatment instruction for treating the plant with a plant treatment mechanism based on the received information describing a treatment to be applied to plants in the determined plant group and the representative location; and
actuating the plant treatment mechanism using the plant treatment instruction to treat the plant.

20. The non-transitory computer readable storage medium of claim 19, wherein the plant identification model is trained with images that include plant group labels.

21. The non-transitory computer readable storage medium of claim 19, wherein the received information is based on user input specifying (1) and (2).

* * * * *